United States Patent
Yamaguchi et al.

[11] Patent Number: 6,002,931
[45] Date of Patent: Dec. 14, 1999

[54] INTERWORKING APPARATUS FOR ROAMING AMONG DIFFERENT MOBILE NETWORKS

[75] Inventors: Akira Yamaguchi, Tokyo; Masayoshi Ohashi, Saitama, both of Japan; Yoshihiko Nodera, London, United Kingdom; Toshinori Suzuki, Tokyo; Fumio Watanabe, Saitama, both of Japan

[73] Assignee: Kokusai Denshin Denwa Co. Ltd., Tokyo, Japan

[21] Appl. No.: 08/689,662

[22] Filed: Aug. 13, 1996

[30] Foreign Application Priority Data

Aug. 15, 1995 [JP] Japan ................................. 7-228611

[51] Int. Cl.[6] ........................................... H04Q 7/00
[52] U.S. Cl. ........................................... 455/433; 379/207
[58] Field of Search ........................ 455/432, 410, 455/413, 433, 456; 379/144, 219, 207; 370/467

[56] References Cited

U.S. PATENT DOCUMENTS

| | | |
|---|---|---|
| 5,210,786 | 5/1993 | Itoh . |
| 5,345,502 | 9/1994 | Rothenhofer ........................... 379/207 |
| 5,406,616 | 4/1995 | Bjorndahl . |
| 5,467,381 | 11/1995 | Peltonen et al. . |
| 5,473,681 | 12/1995 | Partridge, III . |
| 5,537,457 | 7/1996 | Lantto et al. . |
| 5,564,068 | 10/1996 | Nguyen ........................... 455/433 |
| 5,592,466 | 1/1997 | Buczny et al. . |
| 5,610,974 | 3/1997 | Lantto . |
| 5,649,301 | 7/1997 | Yausaki et al. . |
| 5,664,005 | 9/1997 | Emery et al. . |
| 5,670,950 | 9/1997 | Otsuka . |
| 5,675,628 | 10/1997 | Hokkanen ........................... 455/433 |
| 5,734,700 | 3/1998 | Hauser et al. . |

*Primary Examiner*—William Cumming
*Assistant Examiner*—Linwood Scott
*Attorney, Agent, or Firm*—Nikaido Marmelstein Murray & Oram LLP

[57] ABSTRACT

An interworking apparatus for roaming among a plurality of mobile network having different inter-network signaling protocols is connected to the plurality of mobile networks and has a database record for holding network identity information for identifying a mobile network to which at least one mobile user (mobile station and another mobile terminal such as IC device) to be traced is visited.

8 Claims, 31 Drawing Sheets

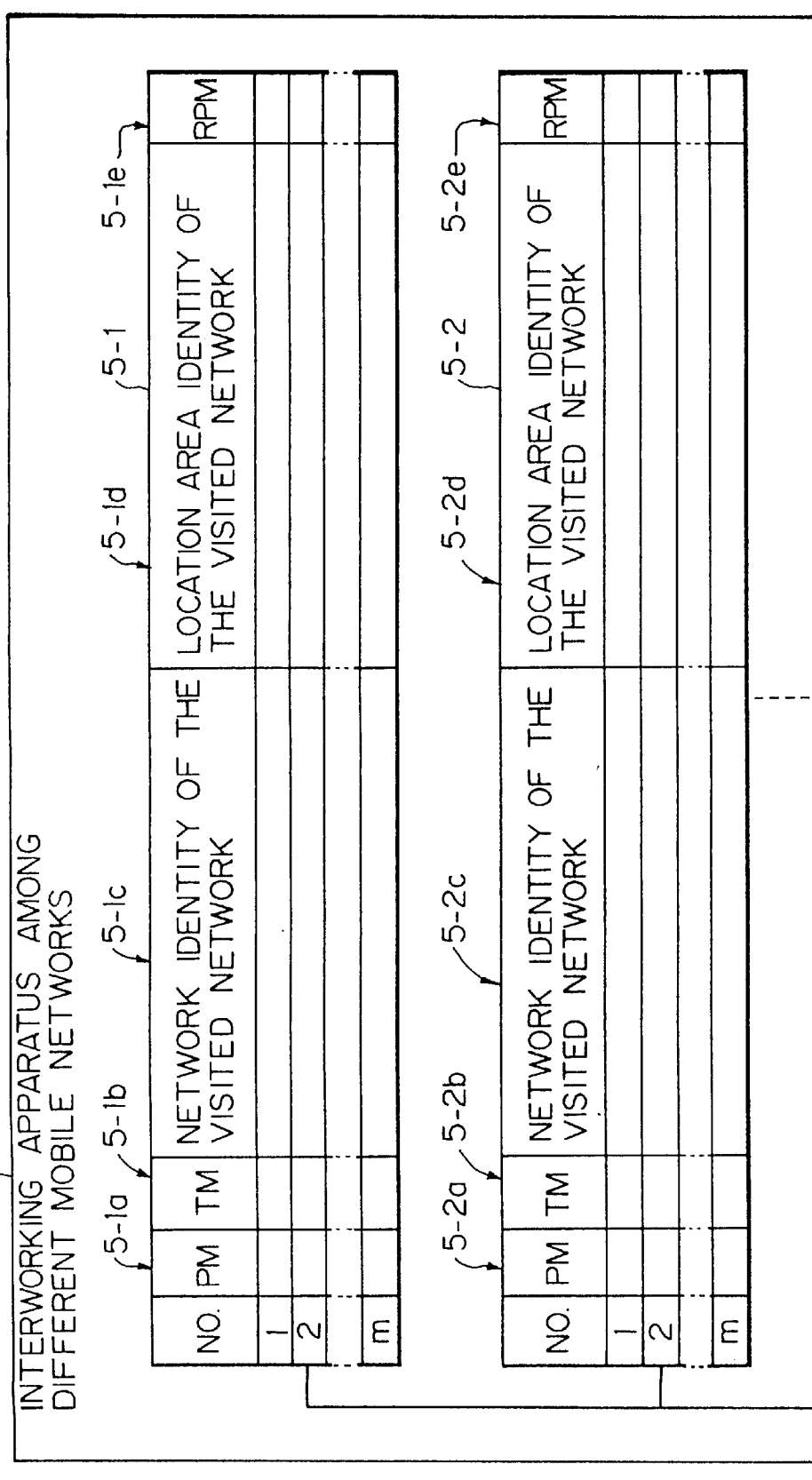

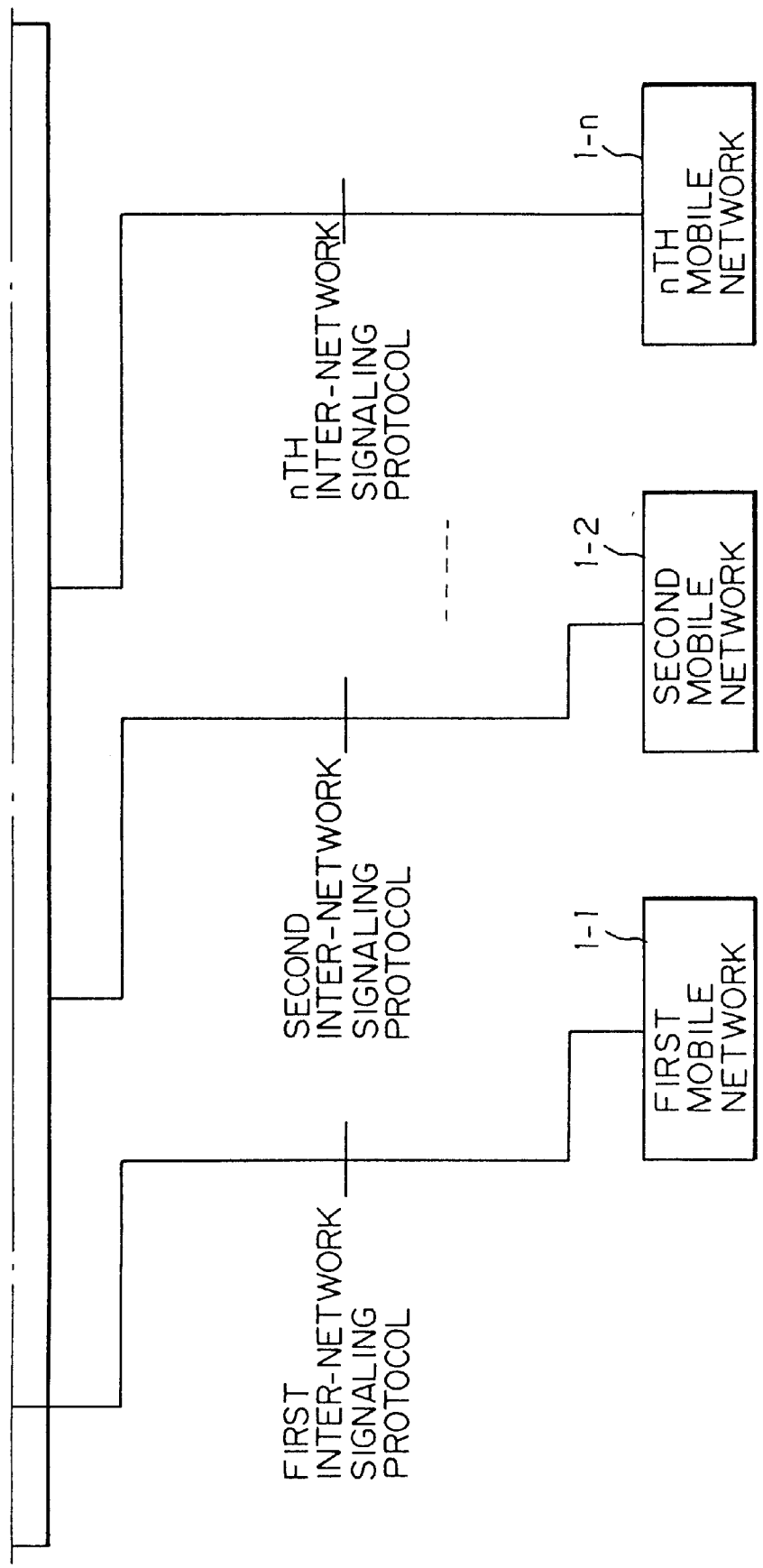

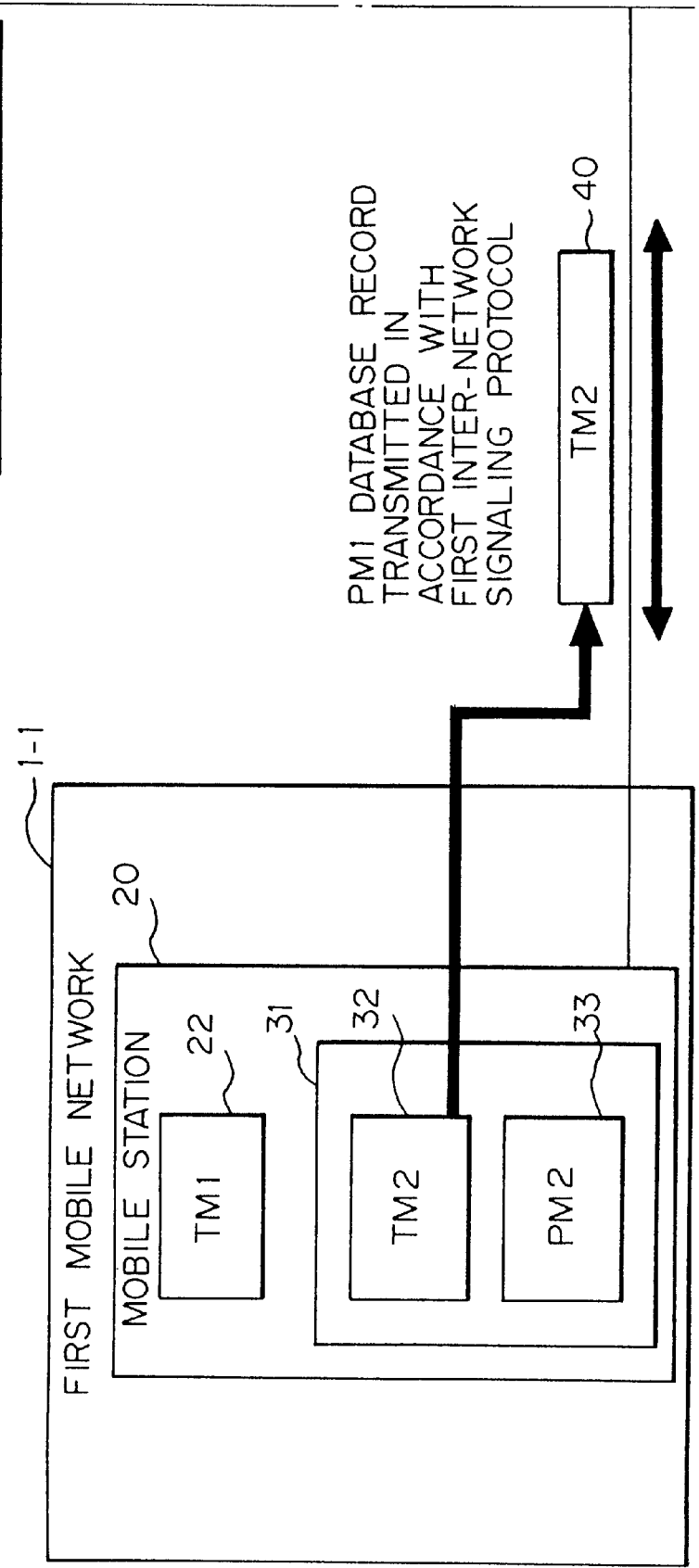

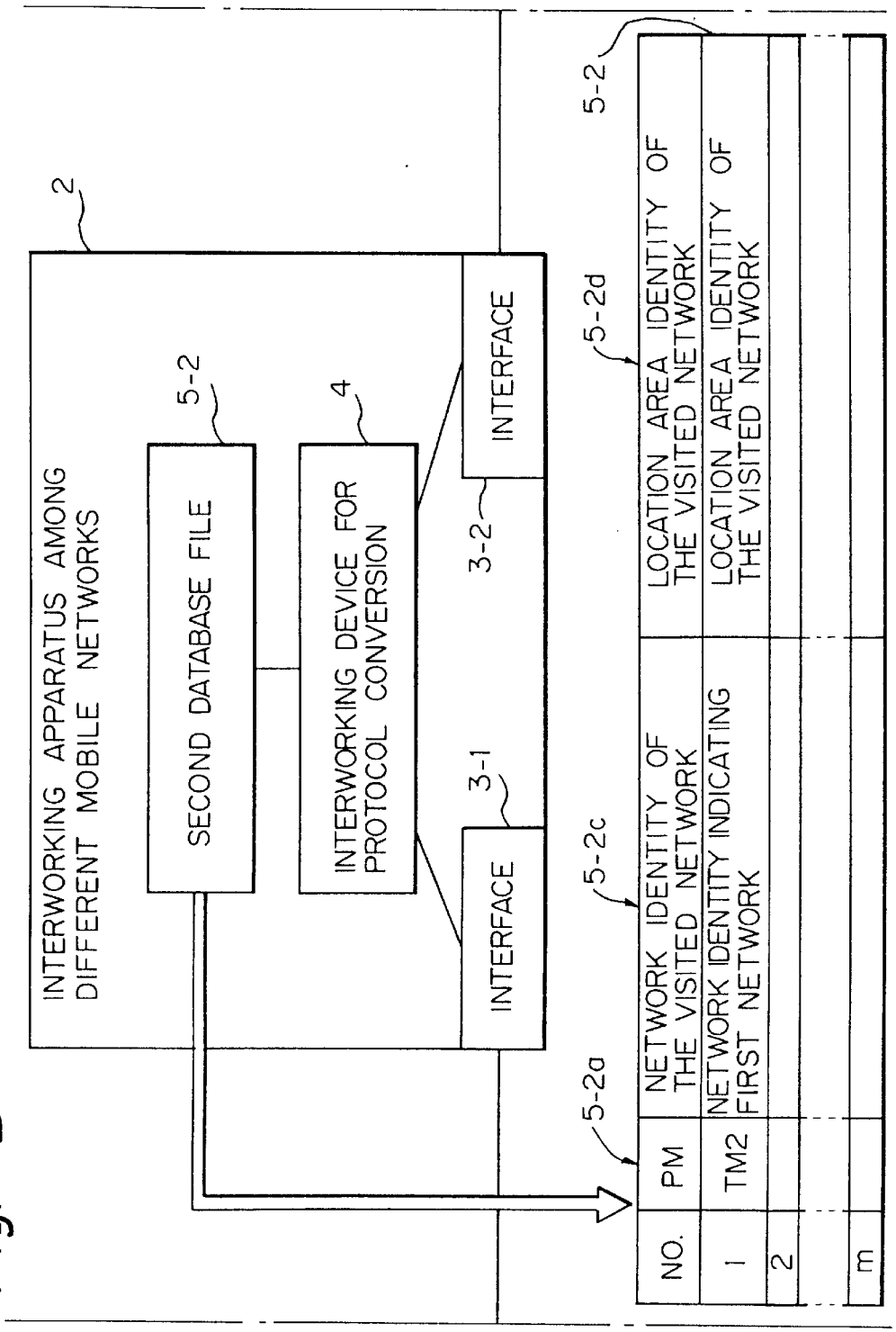

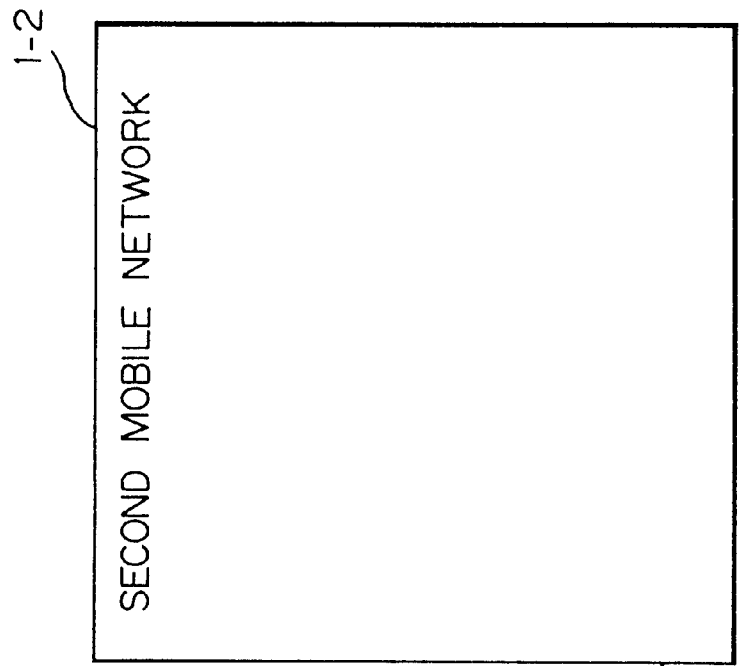

FIRST MOBILE NETWORK 1-1 — INTERWORKING APPARATUS 2 — SECOND MOBILE NETWORK 1-2

SECOND NETWORK IC DEVICE 31 IS INSERTED INTO MOBILE STATION 20

S1

S2

(a) INSERTED SECOND NETWORK IC DEVICE 31 IS CONSIDERED AS FIRST NETWORK IC DEVICE (b) TM DATABASE RECORD 32 OF IC DEVICE 31 IS CONSIDERED AS PM DATABASE RECORD OF THE FIRST NETWORK IC DEVICE (c) TM DATABASE RECORD 32 IS ACCESSED TO READ OUT TM2

(d) TM2 IS STORED IN PM1 DATABASE RECORD 40 TRANSMITTED IN ACCORDANCE WITH FIRST INTRA/INTER-NETWORK SIGNALING PROTOCOL

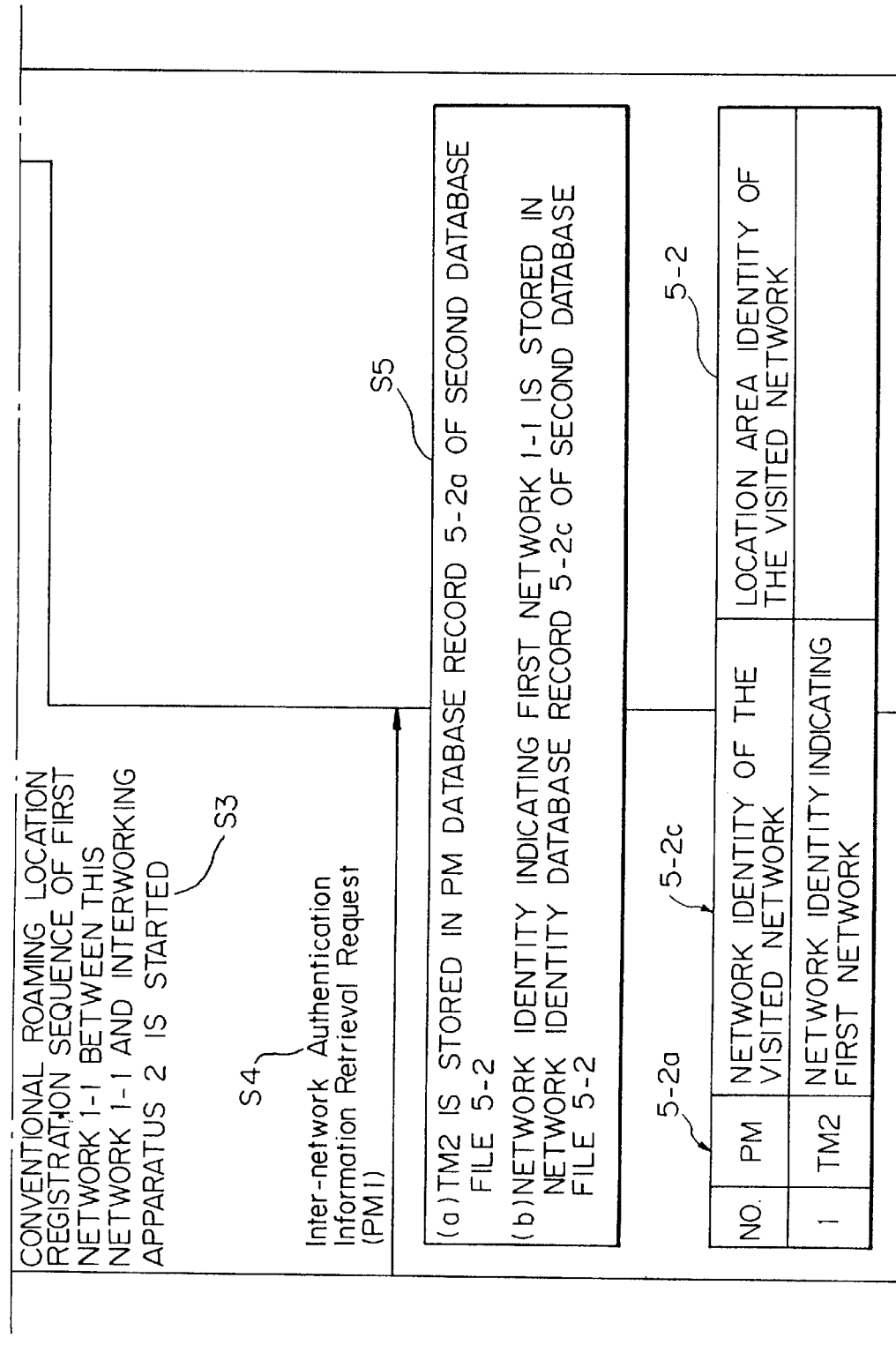

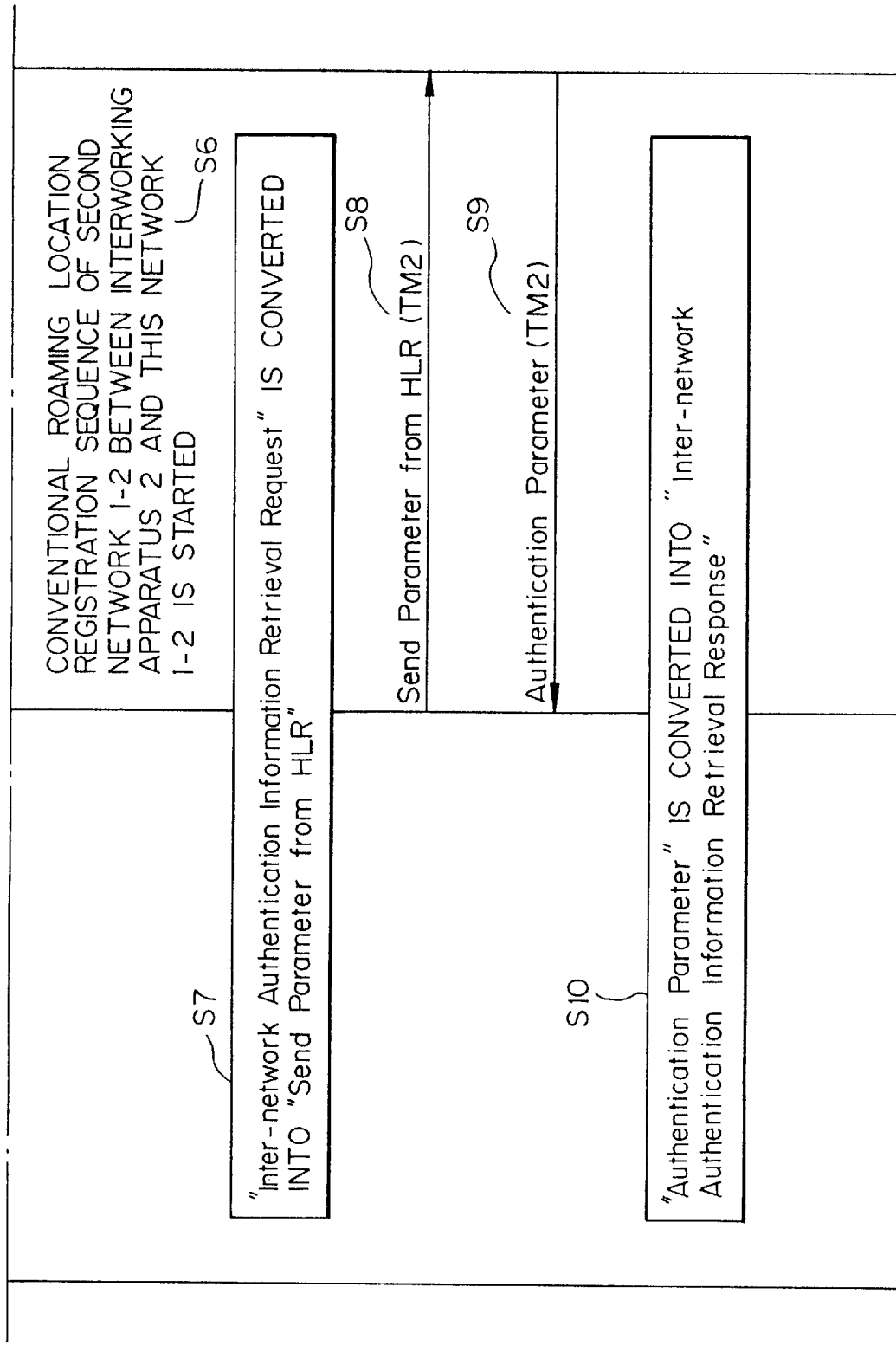

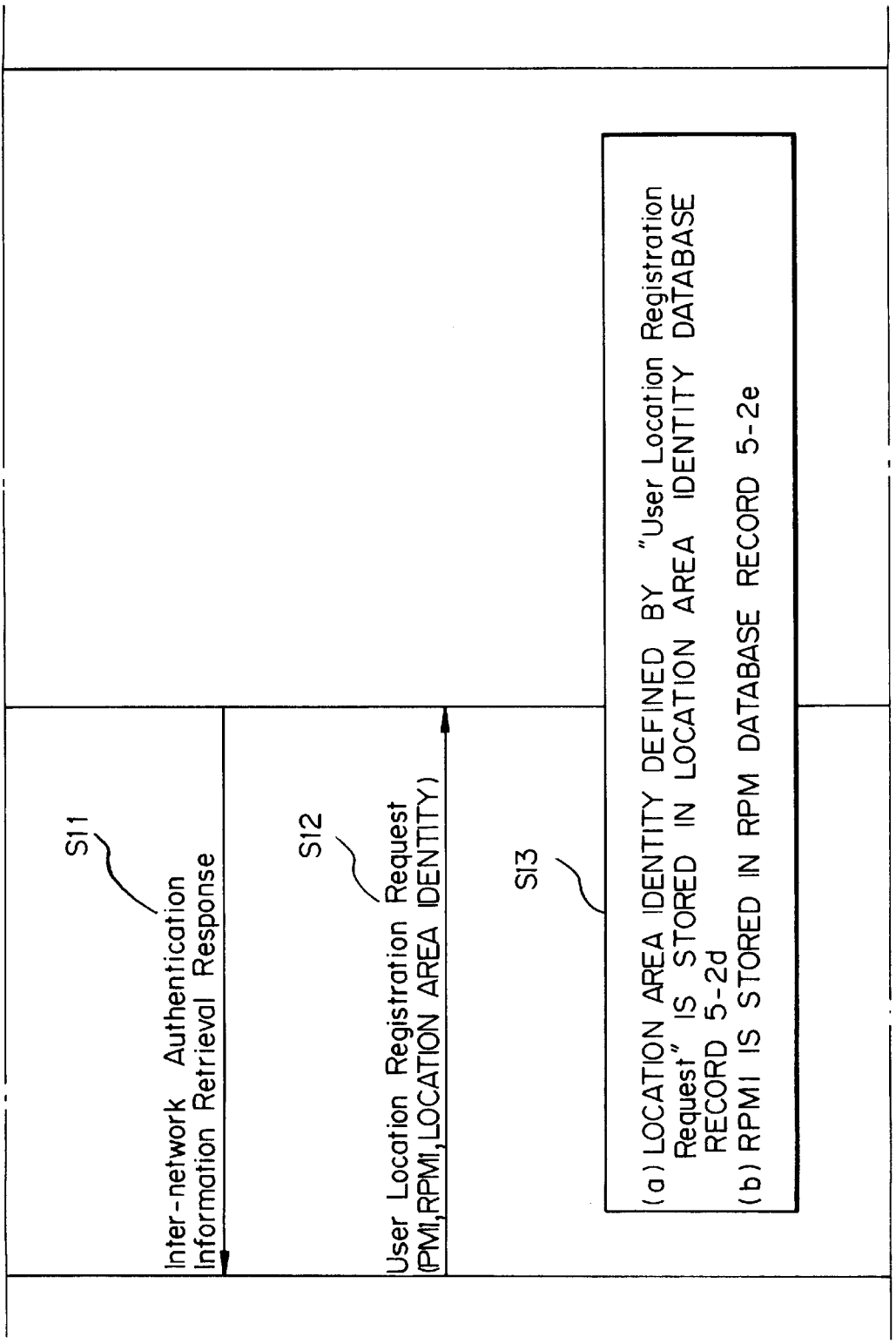

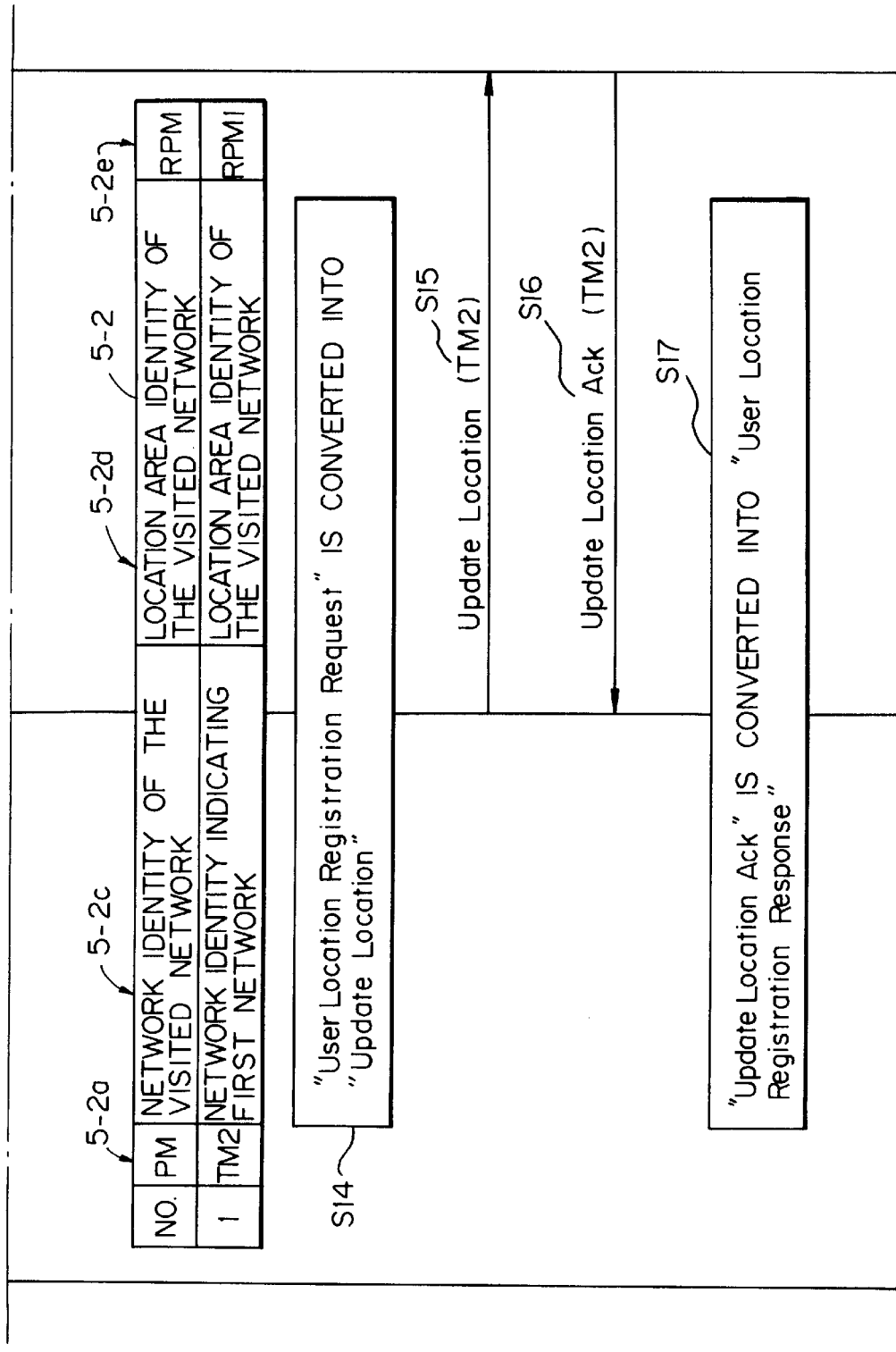

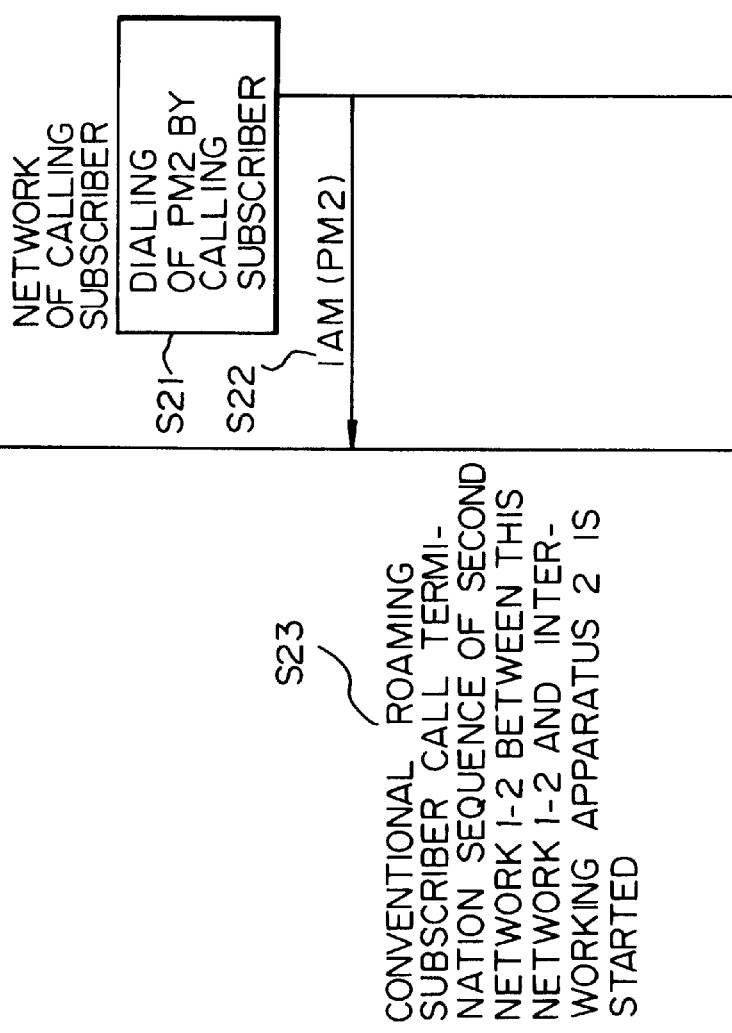

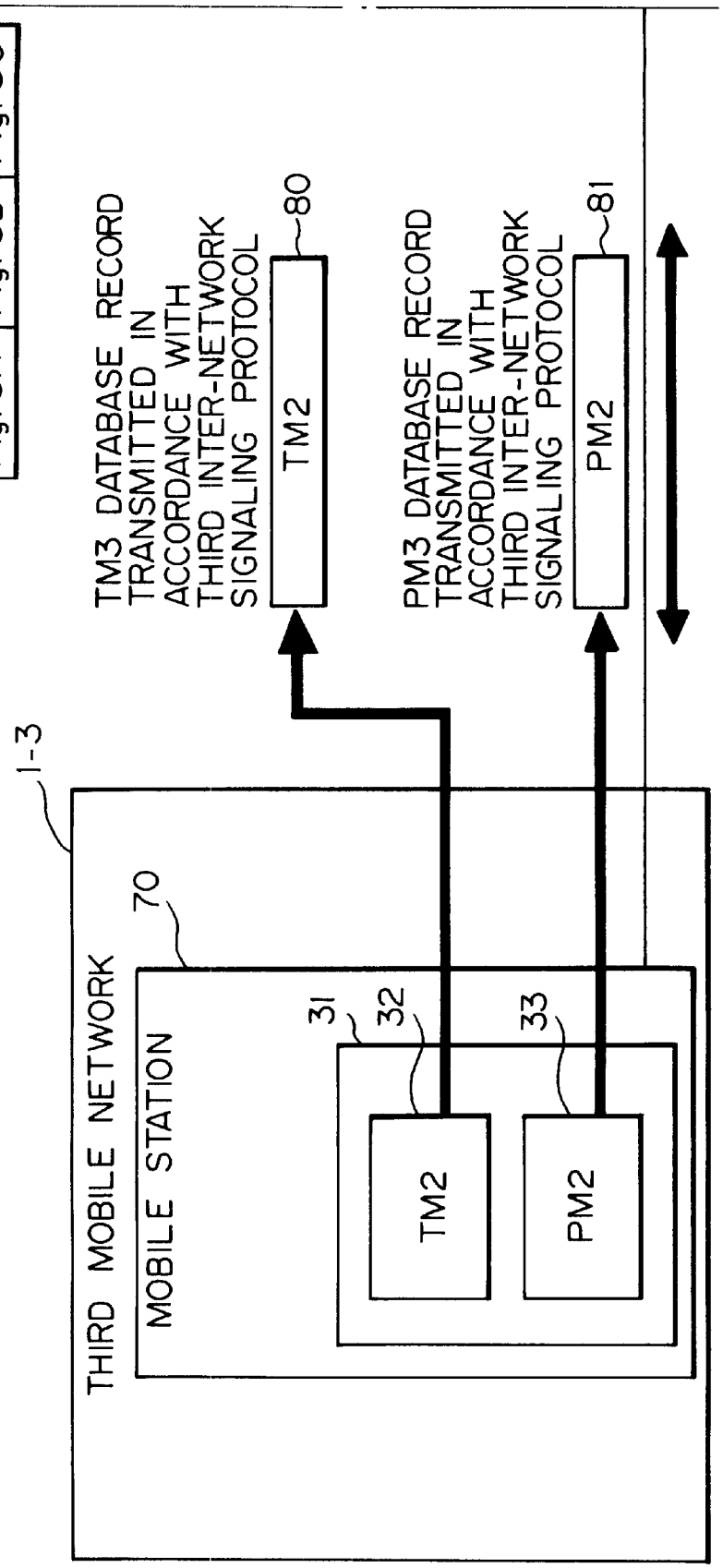

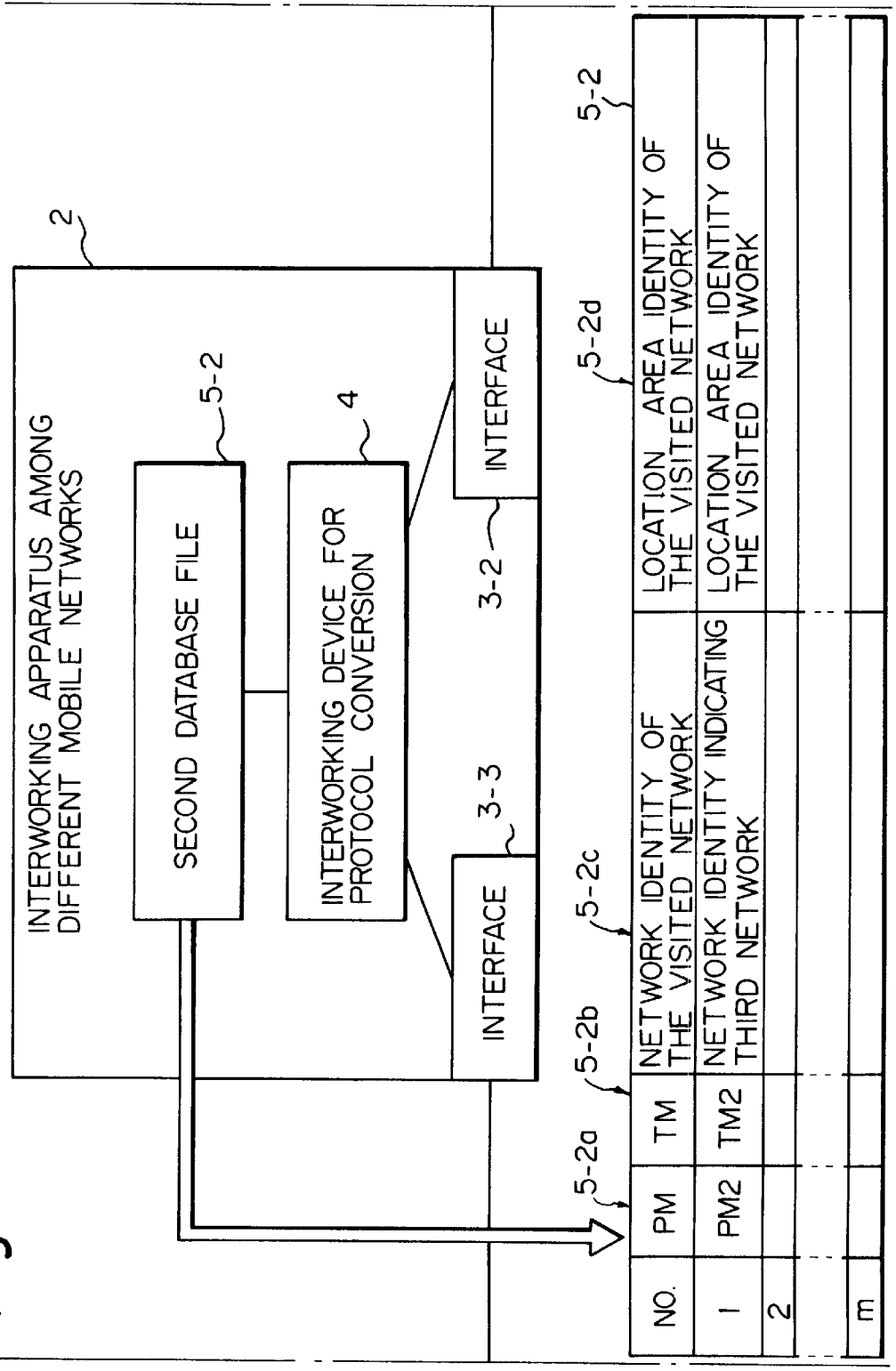

*Fig. 8C*
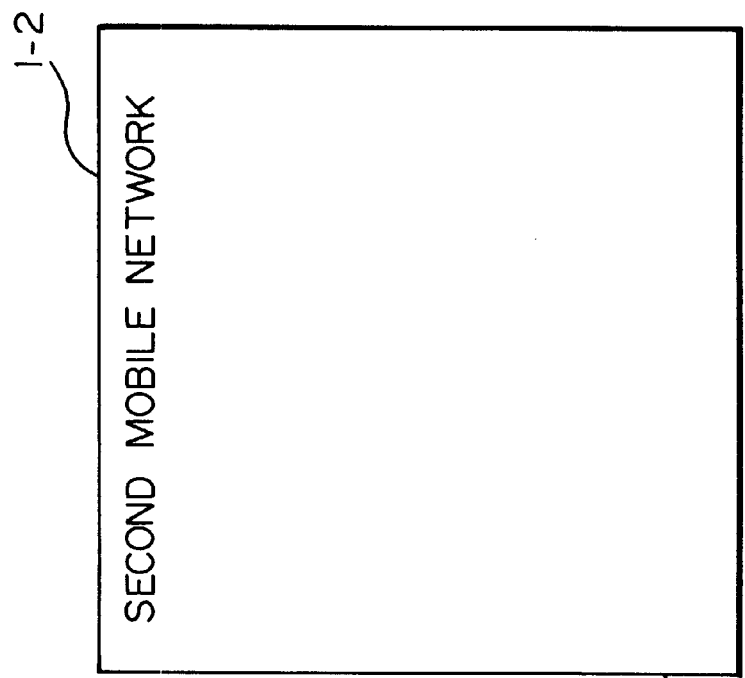
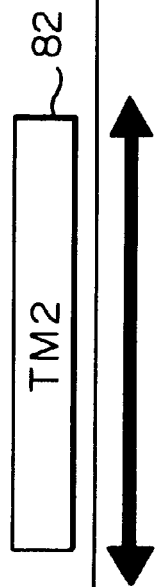
TM2 DATABASE RECORD TRANSMITTED IN ACCORDANCE WITH SECOND INTER-NETWORK SIGNALING PROTOCOL

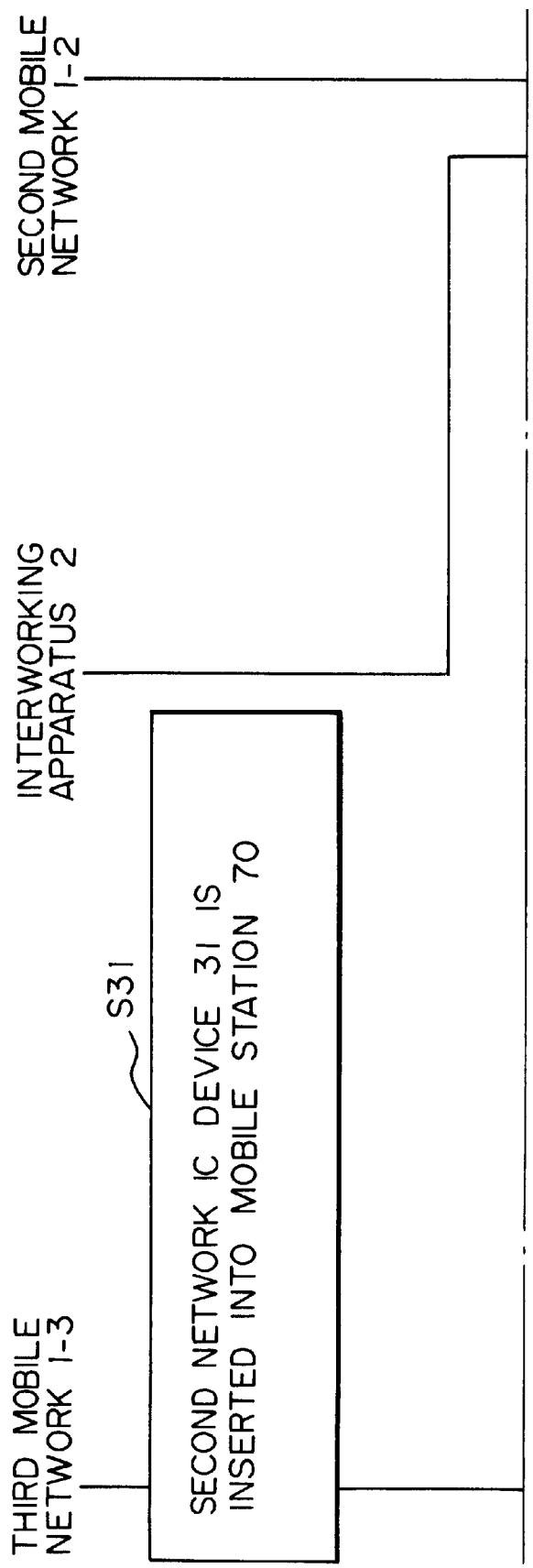

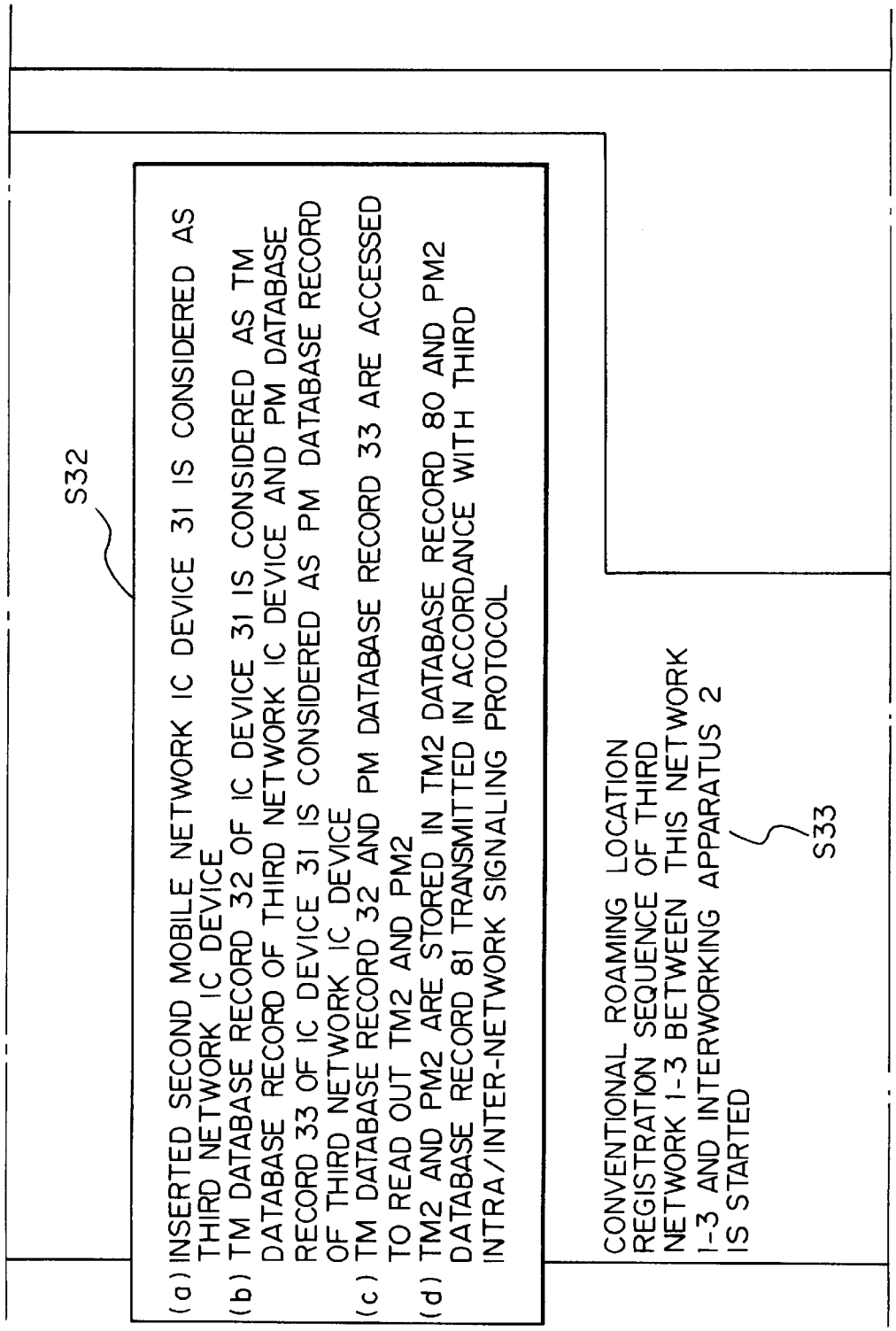

Fig. 9B (a) INSERTED SECOND MOBILE NETWORK IC DEVICE 31 IS CONSIDERED AS THIRD NETWORK IC DEVICE
(b) TM DATABASE RECORD 32 OF IC DEVICE 31 IS CONSIDERED AS TM DATABASE RECORD OF THIRD NETWORK IC DEVICE AND PM DATABASE RECORD 33 OF IC DEVICE 31 IS CONSIDERED AS PM DATABASE RECORD OF THIRD NETWORK IC DEVICE
(c) TM DATABASE RECORD 32 AND PM DATABASE RECORD 33 ARE ACCESSED TO READ OUT TM2 AND PM2
(d) TM2 AND PM2 ARE STORED IN TM2 DATABASE RECORD 80 AND PM2 DATABASE RECORD 81 TRANSMITTED IN ACCORDANCE WITH THIRD INTRA/INTER-NETWORK SIGNALING PROTOCOL

S32

CONVENTIONAL ROAMING LOCATION REGISTRATION SEQUENCE OF THIRD NETWORK 1-3 BETWEEN THIS NETWORK 1-3 AND INTERWORKING APPARATUS 2 IS STARTED

S33

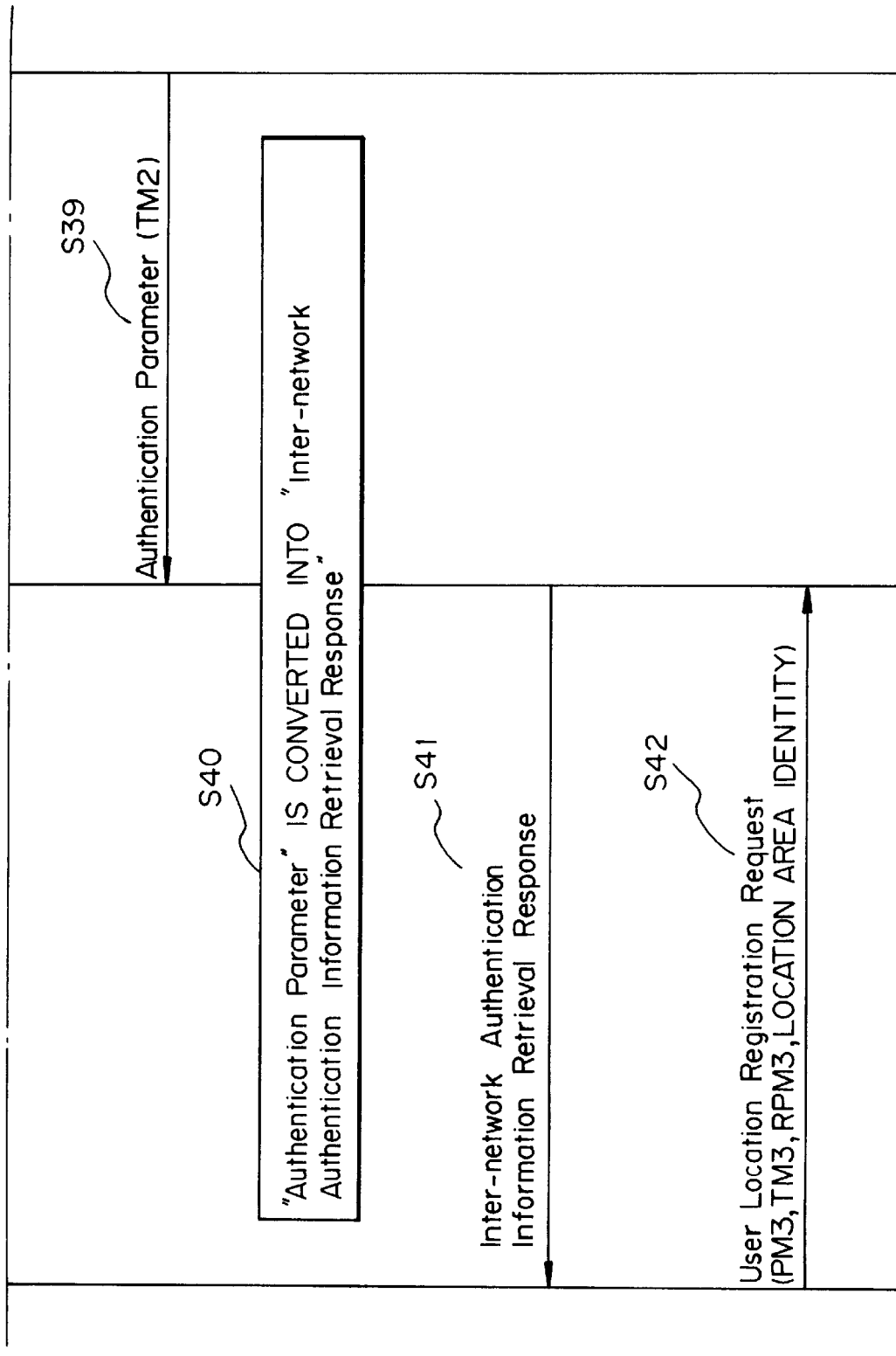

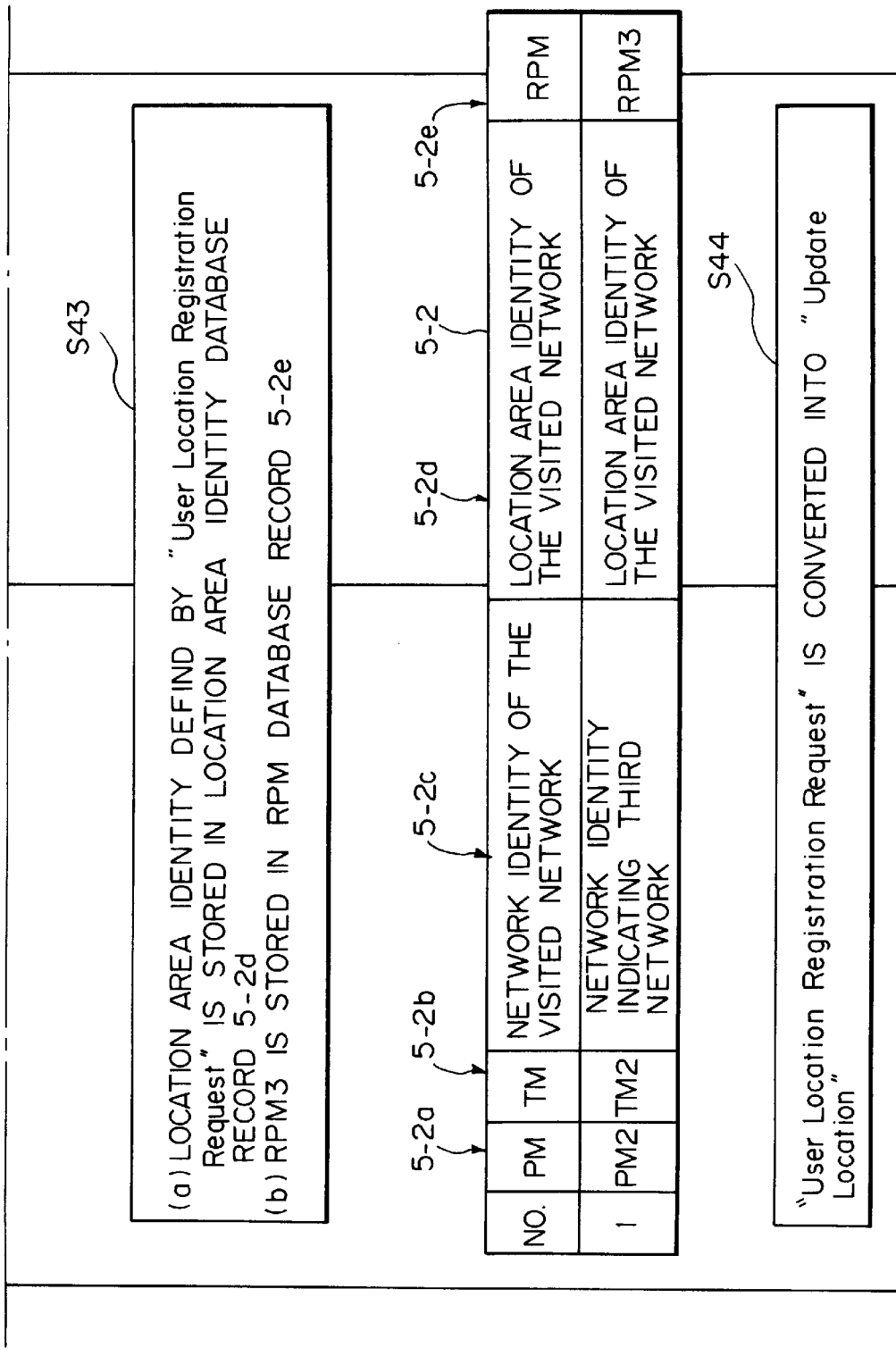

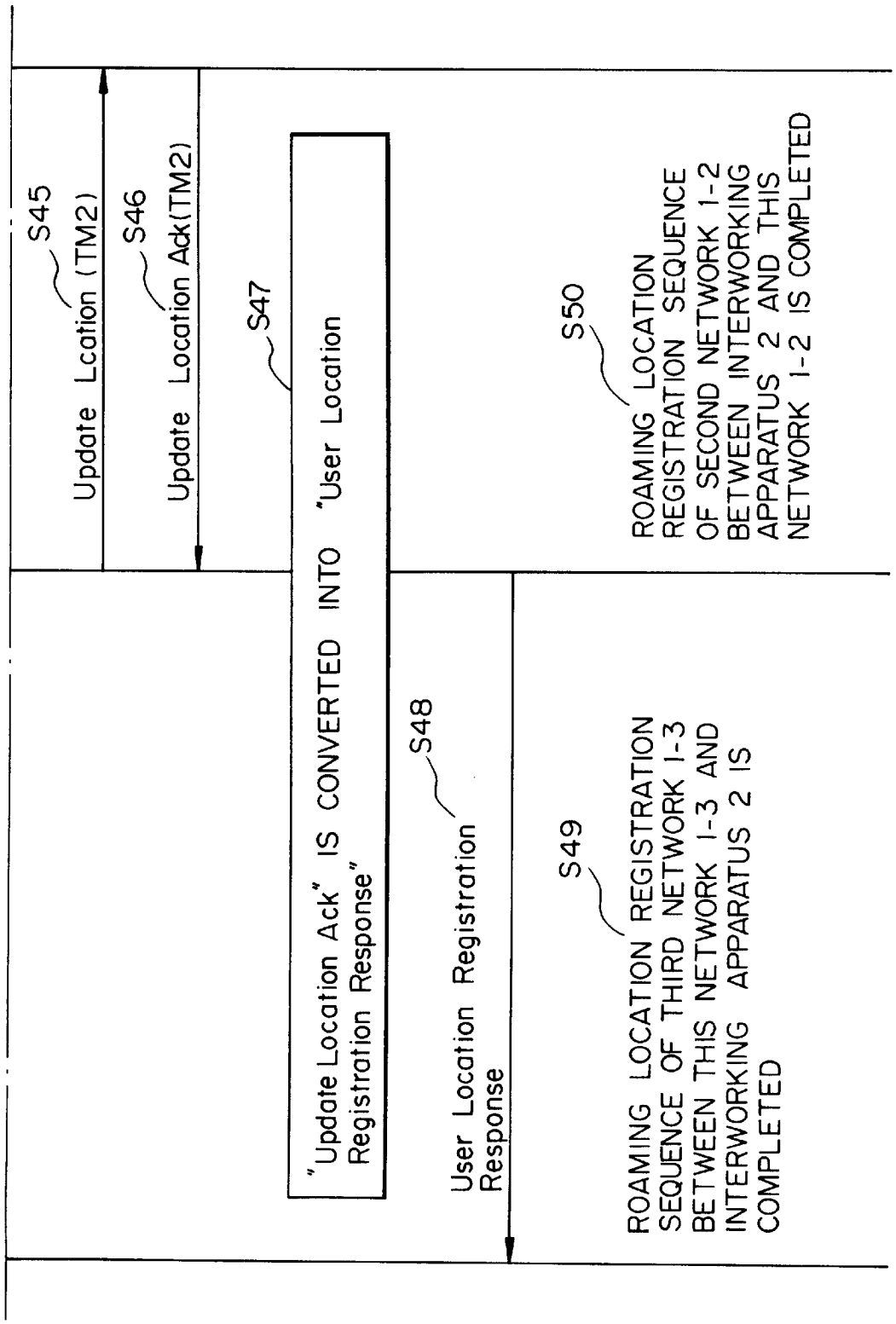

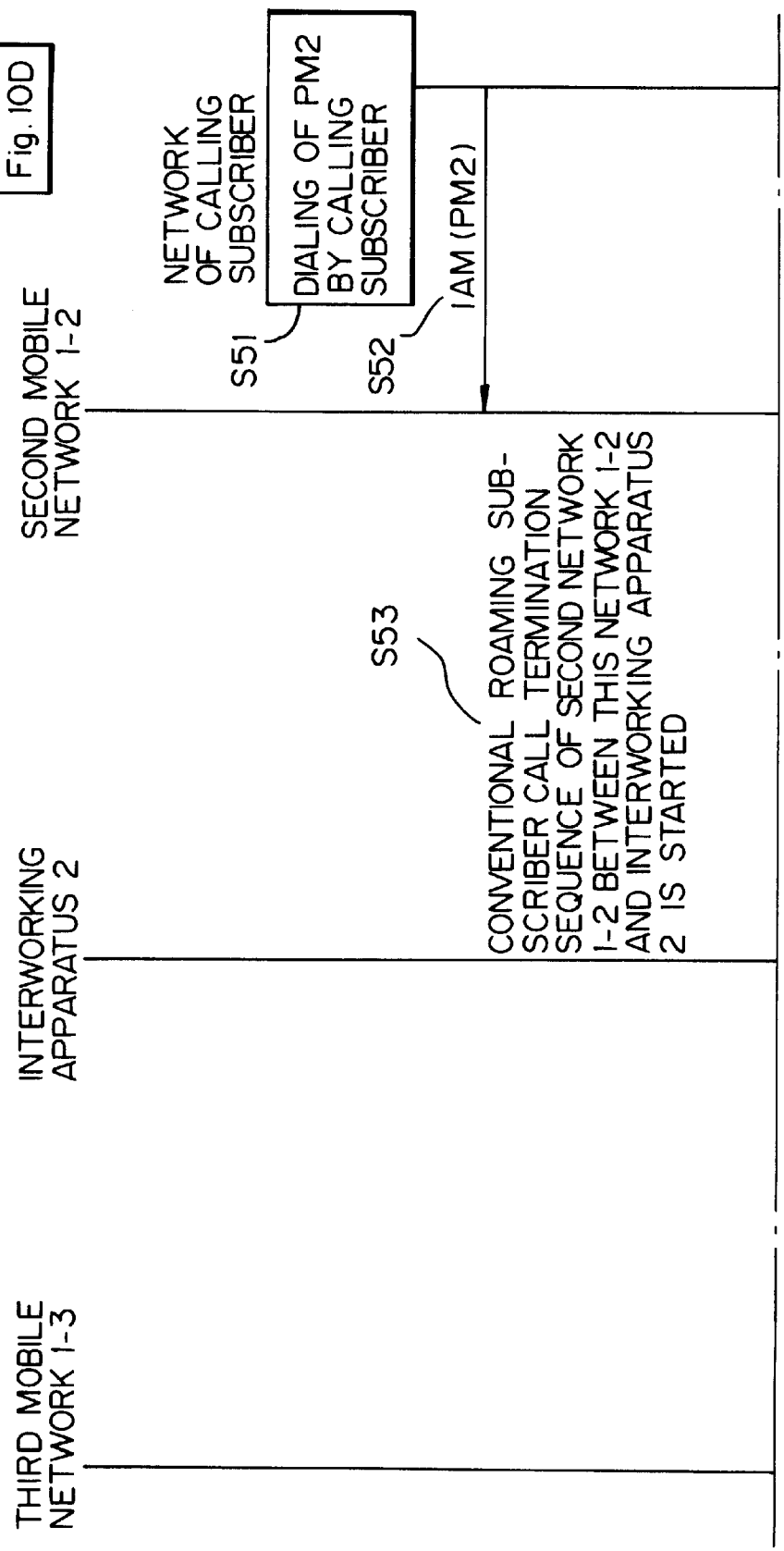

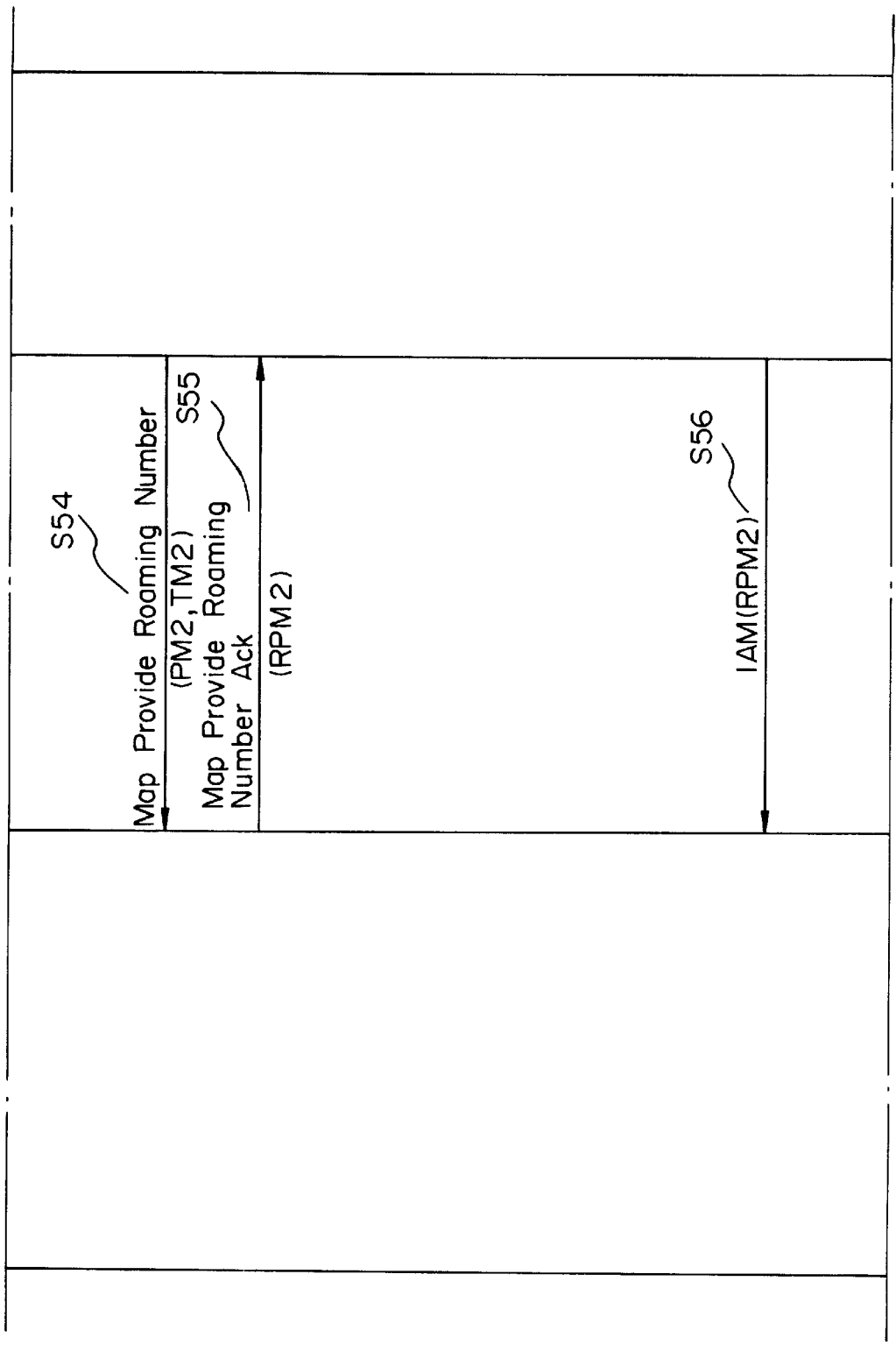

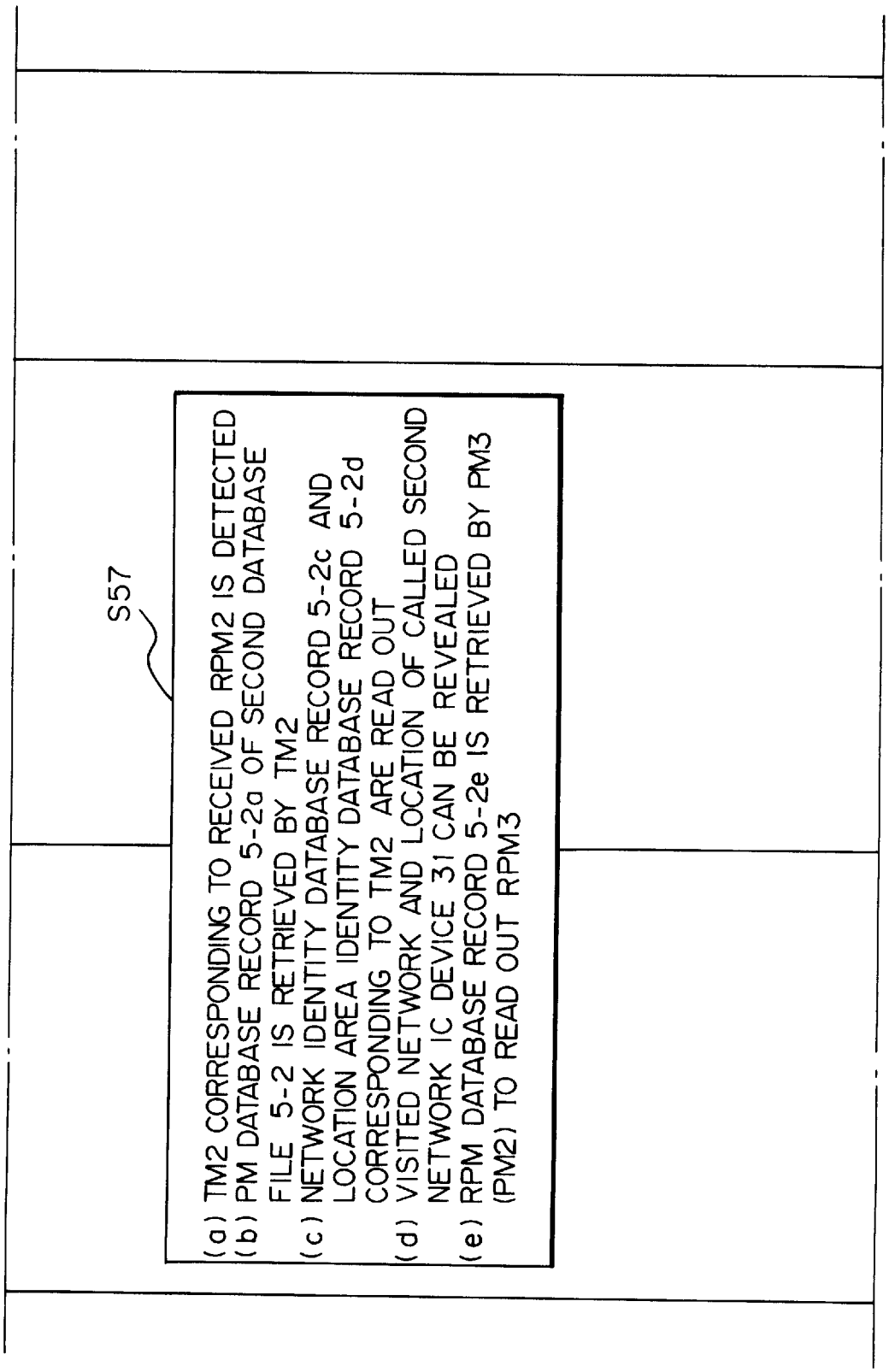

Fig. 10C (a) TM2 CORRESPONDING TO RECEIVED RPM2 IS DETECTED
(b) PM DATABASE RECORD 5-2a OF SECOND DATABASE FILE 5-2 IS RETRIEVED BY TM2
(c) NETWORK IDENTITY DATABASE RECORD 5-2c AND LOCATION AREA IDENTITY DATABASE RECORD 5-2d CORRESPONDING TO TM2 ARE READ OUT
(d) VISITED NETWORK AND LOCATION OF CALLED SECOND NETWORK IC DEVICE 31 CAN BE REVEALED
(e) RPM DATABASE RECORD 5-2e IS RETRIEVED BY PM3 (PM2) TO READ OUT RPM3

S57

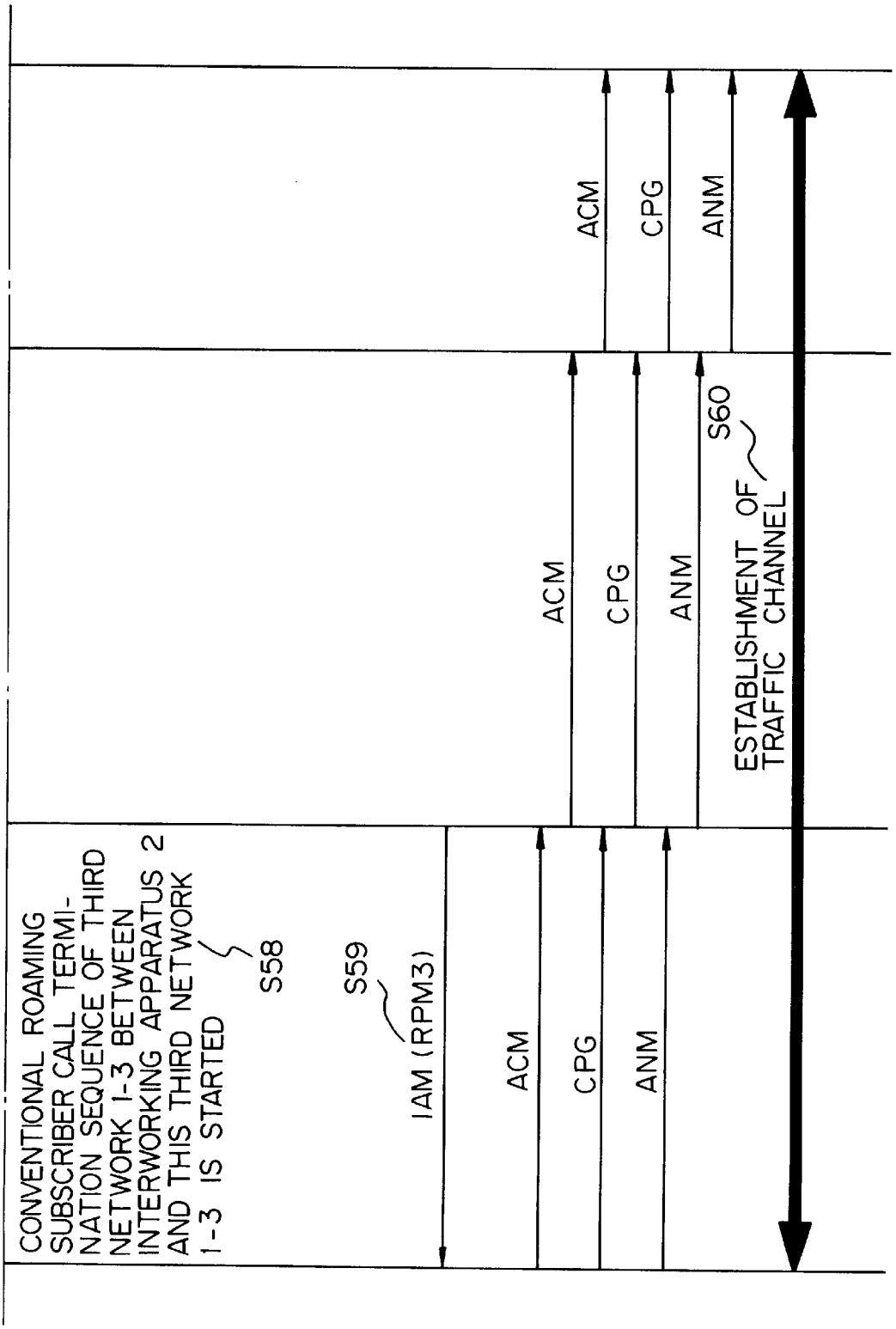

//6,002,931

INTERWORKING APPARATUS FOR ROAMING AMONG DIFFERENT MOBILE NETWORKS

FIELD OF THE INVENTION

The present invention relates to an interworking apparatus. for roaming among different mobile networks. Particularly, the present invention relates to an interworking apparatus for roaming among a plurality of mobile networks having different inter-network signaling protocols, respectively. The apparatus traces a position of a mobile station which intends to access (roam) to a visited network with an inter-network signaling protocol different from that in the home network by relating, on database records in the interworking apparatus, subscriber numbers and terminal identities which are different for the respective networks.

DESCRIPTION OF THE RELATED ART

In the conventional mobile networks, subscriber numbers are determined for identifying users of mobile networks using the same inter-network signaling protocol and terminal identities are determined for identifying terminals.

The terminal identity and the subscriber number are used, in the conventional mobile networks, for registering a location of the mobile station, for originating a call from the mobile station and for terminating a call to the mobile station. The terminal identity and the subscriber number are also used for roaming between mobile networks having the same inter-network signaling protocol.

Location registration of a roaming subscriber and call termination to a roaming subscriber in a mobile network in which intra/inter-network signaling protocol of PDC (Personal Digital Cellular) is adopted will be performed as follows.

In the PDC network, a database of HLR (Home Location Register) for managing subscribers and terminals registered in this PDC network as a home network and a database of GLR (Gateway Location Register) for managing roaming subscribers and terminals visiting to this PDC network from another PDC networks are provided.

Namely, in case that there are first and second PDC networks, when a subscriber of the first PDC network registers its location to the visited second PDC network, a network identity of the second PDC network is stored in a database record for network identities of visited networks in the HLR of the first PDC network. Furthermore, a subscriber number of this roaming subscriber is stored in a database record for roaming subscriber numbers in the GLR of the second PDC network, and also a location area identity of this roaming subscriber is stored in a database record for location area identities of visited networks in the GLR of the second PDC network.

To call the roaming subscriber, its subscriber number (phone number) is dialed. Since it can be determined from the dialed subscriber number that the home network of the called roaming subscriber is the first PDC network, the database record for network identities of visited networks at the subscriber number in the HLR of the first PDC network is retrieved. As a result, the stored network identity of the visited network is read out and thus it can be determined that the visited network of the called subscriber is the second PDC network. Then, the database record for location area identities of visited networks in the GLR of the second PDC network is retrieved to read out the stored location area identity of this called subscriber. Since both the visited network of the called subscriber (the second PDC network) and the location area identity of the visited network are revealed, a location of the called subscriber can be traced and a traffic channel will be established in accordance with the traced result.

Location registration of a roaming subscriber and call termination to a roaming subscriber in a mobile network in which intra/inter-network signaling protocol of GSM (Global System for Mobile Communications) is adopted will be carried out with the similar sequence as that in the PDC networks. However, in the GSM network, a database of VLR (Visitor Location Register) which is different from the GLR in the PDC network is used. Also, in the GSM network, treatment of subscriber numbers and terminal identities and various signaling protocols are different from these in the PDC network.

The intra/inter-network signaling protocol of PDC is described in "MOBILE APPLICATION PART (MAP) SIGNALING SYSTEM of Digital Mobile Communications Network, Inter-node Interface (DMNI) for PDC" issued by The Telecommunication Technology Committee, 1995, in detail. The intra/inter-network signaling protocol of GSM is described in European Telecommunication Standard, FINAL DRAFT PrETS 300 599, "European digital cellular telecommunications system (Phase 2), Mobile Application Part (MAP) specification" (GSM 09.02) issued by European Telecommunications Standards Institute, November 1994, in detail.

The mobile station may be realized by inserting a removable IC device such as an IC card or IC chip into a terminal.

As described herein before, in the conventional mobile networks, roaming can be realized only among mobile networks using the same inter-network signaling protocol. In other words, roaming among mobile networks having different inter-network signaling protocols, for example roaming between the GSM network and the PDC network cannot be expected.

SUMMARY OF THE INVENTION

It is therefore an object of the present invention to provide an interworking apparatus which can realize roaming among a plurality of mobile networks having different inter-network signaling protocols, respectively.

According to the present invention, an interworking apparatus for roaming among a plurality of mobile networks having different inter-network signaling protocols is provided. This apparatus is connected to the plurality of mobile network and has a database record for holding network identity information for identifying a mobile network to which at least one mobile user (mobile station and another mobile terminal such as IC device) to be traced is visited.

It is preferred that the apparatus further has a database record for holding location area identity information for identifying a location area of the mobile user in the visited mobile network.

Particularly, according to the present invention, an interworking apparatus for roaming among a plurality of mobile networks including a first mobile network having a first inter-network signaling protocol which uses a subscriber number PM1 for identifying a subscriber and a terminal identity TM1 for identifying a terminal, and a second mobile network having a second inter-network signaling protocol which is different from the first inter-network signaling protocol and uses a terminal identity TM2 for identifying a terminal is provided. The apparatus is connected to the first and second mobile networks and has a subscriber number database record for holding the subscriber number PM1, and a unit for storing the terminal identity TM2 of a mobile user visiting from the second mobile network to the first mobile network into the subscriber number database record. The visiting mobile user is traced in the first mobile network by using the terminal identity TM2 stored in the subscriber number database record.

The terminal identity TM2 is stored in the PM database record for storing the subscriber number PM1. Thus, the visiting mobile user which is now visiting from its home mobile network to the first mobile network using different signaling protocol as that of the home network can be traced and thus roaming operations among these different networks can be realized.

In this case, it is preferred that the apparatus further has a database record for holding network identity information for identifying the visited mobile network.

It is also preferred that the apparatus further has a database record for holding location area identity information for identifying a location area of the visited mobile user in the mobile network.

Furthermore, according to the present invention, an interworking apparatus for roaming among a plurality of mobile networks including a second mobile network having a second inter-network signaling protocol which uses a subscriber number PM2 for identifying a subscriber and a terminal identity TM2 for identifying a terminal, and a third mobile network having a third inter-network signaling protocol which is different from the second inter-network signaling protocol and uses a subscriber number PM3 for identifying a subscriber and a terminal identity TM3 for identifying a terminal is provided. The apparatus is connected to the second and third mobile networks and has a subscriber number database record for holding the subscriber number PM3, a terminal identity database record for holding the terminal identity TM3, a unit for storing the subscriber number PM2 of a mobile user visiting from the second mobile network to the third mobile network into the subscriber number database record, and a unit for storing the terminal identity TM2 of the visiting mobile user into the terminal identity database record. The visiting mobile user is traced in the third mobile network by using the subscriber number PM2 stored in the subscriber number database record and the terminal identity TM2 stored in the terminal identity database record.

The terminal identity TM2 is stored in the TM database record for storing the terminal identity TM3 and the subscriber number PM2 is stored in the PM database record for storing the subscriber number PM3. The visiting mobile user which is now visiting from its home mobile network to the third mobile network using different signaling protocol as that of the home network can be traced and thus roaming operations among these different networks can be realized.

In this case, it is preferred that the apparatus further has a database record for holding network identity information for identifying the visited mobile network.

It is also preferred that the apparatus further has a database record for holding location area identity information for identifying a location area of the mobile user in the visited mobile network.

As described above, according to the present invention, a roaming among a plurality of mobile networks having different inter-network signaling protocols can be realized.

Particularly, the present invention is effective for a roaming among the different mobile networks by using an IC device such as an IC card or an IC chip which holds subscriber numbers and terminal identities and which is considered as a mobile station. It should be noted that the roaming cannot be realized between mobile networks having different inter-network signaling protocols even if the IC device with the subscriber numbers and terminal identities is merely inserted into a mobile station of a visited network without using the interworking apparatus according to the present invention. Namely, by using the interworking apparatus according to the present invention, which has database records for holding a subscriber number PM, a terminal identity TM, a network identity of the visited network and a location area identity of the visited network of the IC device (mobile station) to be traced, the roaming can be realized among the different mobile networks.

Further objects and advantages of the present invention will be apparent from the following description of the preferred embodiments of the invention as illustrated in the accompanying drawings.

BRIEF DESCRIPTION OF THE DRAWINGS

FIG. 1 constituted by combining FIGS. 1A to 1C shows constitution of an interworking apparatus among different mobile networks, and connections between the interworking apparatus and first to nth mobile networks having different inter-network signaling protocols, in a preferred embodiment according to the present invention;

FIG. 4 constituted by combining FIGS. 4A to 4C illustrates functions of the interworking apparatus for roaming from the second mobile network to the first mobile network;

FIG. 5 constituted by combining FIGS. 5A to 5F illustrates a roaming location registration sequence at a roaming from the second mobile network to the first mobile network, for realizing the functions representing in FIG. 4;

FIG. 6 constituted by combining FIGS. 6A to 6C illustrates a call termination sequence to a roaming subscriber in a visited first mobile network, for realizing the functions representing in FIG. 4;

FIG. 8 constituted by combining FIGS. 8A to 8C illustrates functions of the interworking apparatus for roaming from the second mobile network to the third mobile network;

FIG. 9 constituted by combining FIGS. 9A to 9G illustrates a roaming location registration sequence at a roaming from the second mobile network to the third mobile network, for realizing the functions representing in FIG. 8; and FIG. 10 constituted by combining FIGS. 10A to 10D illustrates a call termination sequence to a roaming subscriber in a visited third mobile network, for realizing the functions representing in FIG. 8.

DESCRIPTION OF THE PREFERRED EMBODIMENTS

Figure 1B:
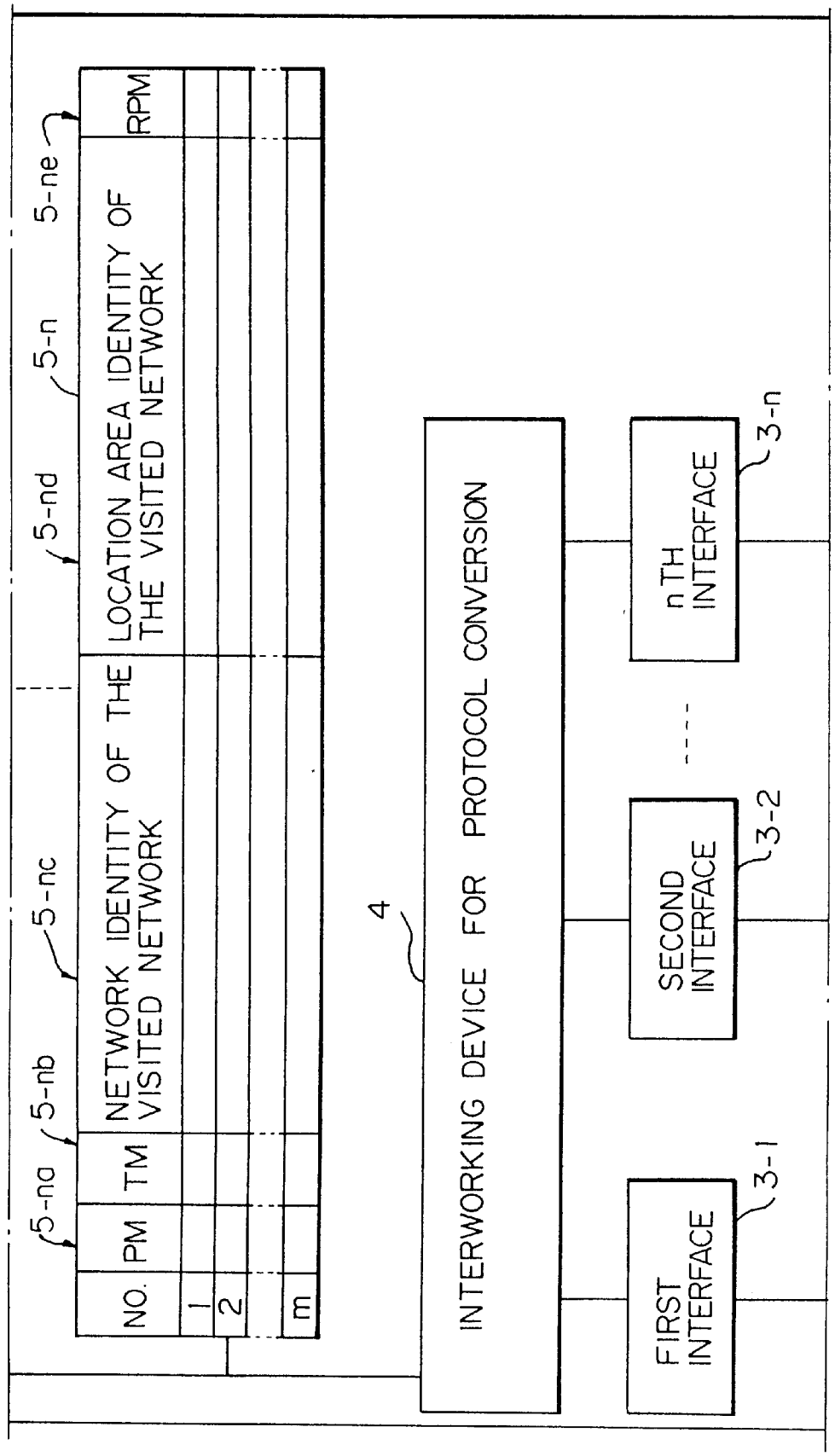

As a preferred embodiment according to the present invention, FIG. 1 shows constitution of an interworking apparatus among different mobile networks, and connections between the interworking apparatus and first to nth mobile networks having inter-network signaling protocols different from each other.

As shown in the figure, a first mobile network 1-1 having a first inter-network signaling protocol, a second mobile network 1-2 having a second inter-network signaling protocol, . . . , and a nth mobile network 1-n having a nth inter-network signaling protocol are connected to an interworking apparatus for roaming among different mobile networks 2. The interworking apparatus 2 includes a first interface 3-1 connected with the first mobile network 1-1, a second interface 3-2 connected with the second mobile network 1-2, . . . , and a nth interface 3-n connected with the nth mobile network 1-n. These interfaces 3-1 to 3-n are connected with an interworking device for protocol conversion 4 in the interworking apparatus 2. The protocol conversion interworking device 4 has a function of processing the inter-network signaling protocols of the first to nth mobile networks 1-1 to 1-n and a function of processing conversions between these protocols.

The interworking apparatus 2 is also provided with a first database file 5-1 for No.1 to No.m mobile stations whose home network is the first mobile network 1-1, a second database file 5-2 for No.1 to No.m mobile stations whose home network is the second mobile network 1-2, . . . , and a nth database file 5-n for No.1 to No.m mobile stations whose home network is the nth mobile network 1-n. These database files 5-1 to 5-n are connected with the protocol conversion interworking device 4.

Each of the database files 5-1 to 5-n has a PM (Personal Mobility) database record for storing subscriber numbers PM of the mobile stations (5-1a, 5-2a, . . . , 5-na), a TM (Terminal Mobility) database record for storing terminal identities TM of the mobile stations (5-1b, 5-2b, . . . , 5-nb), a network identity database record for storing network identities of the visited network of the mobile stations (5-1c, 5-2c, . . . , 5-nc), a location area identity database record for storing location area identities of the visited network of the mobile stations (5-1d, 5-2d, . . . , 5-nd), and a RPM (Roaming Personal Mobility) database record for storing visited subscriber numbers of the mobile stations (5-1e, 5-2e, . . . , 5-ne).

PM of the PM database record means a subscriber number PM in the visited network. Namely, a subscriber number or a terminal identity stored in the PM database record (5-1a, 52a, . . . , 5-na) is treated as a subscriber number defined in the visited network. Similar to this, TM of the TM database record means a terminal identity TM in the visited network. Namely, a terminal identity or a subscriber number stored in the TM database record (5-1b, 5-2b, . . . , 5-nb) is treated as a terminal identity defined in the visited network.

For example, in case that a mobile station of which home network is the second mobile network 1-2 using subscriber numbers PM2 and terminal identities TM2 visits to the first mobile network 1-1 using subscriber numbers PM1 and terminal identities TM1, the PM database record 5-2a in the second database file 5-2 for mobile stations whose home network is the second mobile network 1-2 is considered as the PM database record 5-1a in the first database file 5-1. If a terminal identity TM2 is stored in the PM database record 5-2a, the terminal identity TM2 is treated as a subscriber number PM1 in the mobile network 1-1. This function will be described in this embodiment with referring FIGS. 2 to 6 in detail.

For example, in case that a mobile station of which home network is the second mobile network 1-2 using subscriber numbers PM2 and terminal identities TM2 visits to a third mobile network 1-3 using subscriber numbers PM3 and terminal identities TM3, the TM database record 5-2b in the second database file 5-2 for mobile stations whose home network is the second mobile network 1-2 is considered as a TM database record 5-3b in the third database file 5-3. If a terminal identity TM2 is stored in the TM database record 5-2b, the terminal identity TM2 is treated as a terminal identity TM3 in the mobile network 1-3. This function will be described in an another embodiment with referring FIGS. 7 to 10 in detail.

Each of the network identity database records 5-1c, 52c, . . . , 5-nc stores a network identity of the visited network of the mobile stations. For example, if a network identity of the first mobile network 1-1 is stored therein, it will be understood that the corresponding mobile station is now visiting to the first mobile network 1-1.

Each of the location area identity database records 5-1d, 5-2d, . . . , 5-nd stores location area identities of the visited network of the mobile stations.

Each of the RPM database records 5-1e, 5-2e, . . . , 5-ne stores visited subscriber numbers of the mobile stations.

It should be noted that all of the PM database records 5-1a, 5-2a, . . . , 5-na, the TM database records 5-1b, 5-2b, . . . , 5-nb, the network identity database records 5-1c, 5-2c, . . . , 5-nc, the location area identity database records 5-1d, 5-2d, . . . , 5-nd, and the RPM database records 5-1e, 5-2e, . . . , 5-ne are not always used, but some of them may be selectively used depending upon an inter-network signaling protocol in the visited network. For example, the location area identity database records 5-1d, 5-2d, . . . , 5-nd will not be used when mobile stations visit to a mobile network adopting an inter-network signaling protocol in which no location area identity is transmitted between the networks.

Figure 2:
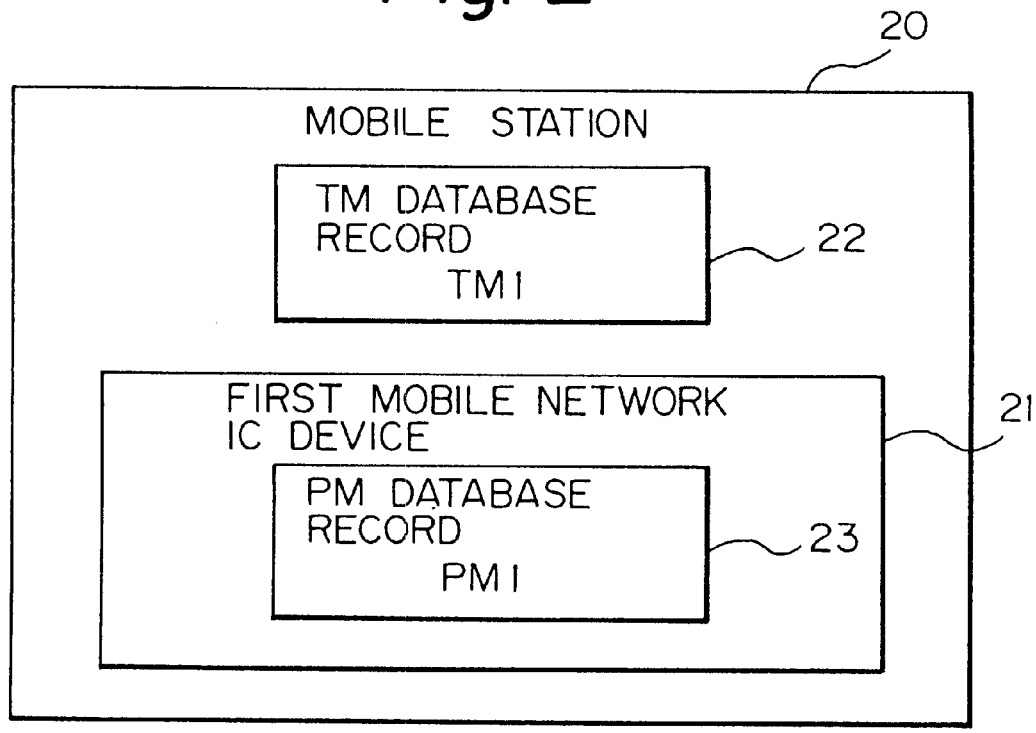
FIG. 2 shows a TM database record and a PM database record in a mobile station of which home network is the first network.

FIG. 2 shows a TM database record and a PM database record in a mobile station of which home network is the first mobile network. A terminal identity TM1 and a subscriber number PM1 of the mobile network 1-1 are stored into the TM database record and the PM database record, respectively.

As shown in FIG. 2, the mobile station 20 has a first mobile network IC device 21 and a TM database record 22. The IC device 21 is provided with a PM database record 23. In the TM database record 22, the terminal identity TM1 of the first mobile network 1-1 is stored. In the PM database record 23, the subscriber number PM1 of the first mobile network 1-1 is stored. The IC device 21 may be constituted by an IC card or by an IC chip. This IC device 21 may be freely removed from the mobile station 20 and inserted into an another mobile station or terminal. An example of the first mobile network 1-1 in which the terminal identity TM1 and the subscriber number PM1 are stored in the mobile station 20, as shown in FIG. 2, may be the aforementioned PDC network.

Figure 3:
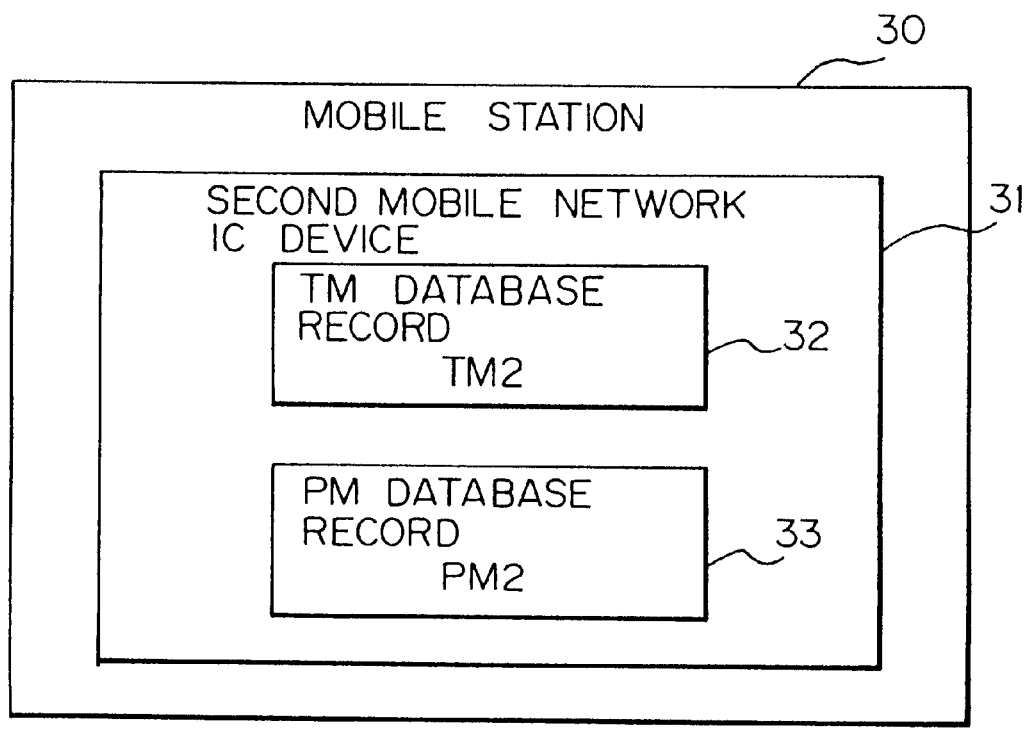
FIG. 3 shows a TM database record and a PM database record in a mobile station of which home network is the second network.

FIG. 3 shows a TM database record and a PM database record in a mobile station of which home network is the second network. A terminal identity TM2 and a subscriber number PM2 of the second mobile network 1-2 are stored into the TM database record and the PM database record, respectively.

As shown in FIG. 3, the mobile station 30 has a second mobile network IC device 31. The IC device 31 is provided with a TM database record 32 and a PM database record 33. In the TM database record 32, the terminal identity TM2 of the second mobile network 1-2 is stored. In the PM database record 33, the subscriber number PM2 of the second mobile network 1-2 is stored. The IC device 31 may be constituted by an IC card or by an IC chip. This IC device 31 may be freely removed from the mobile station 30 and inserted into an another mobile station or terminal. An example of the second mobile network 1-2 in which the terminal identity TM2 and the subscriber number PM2 are stored in the mobile station 30, as shown in FIG. 3, may be the aforementioned GSM network.

FIG. 4 illustrates functions of the interworking apparatus for roaming from the second mobile network 1-2 to the first mobile network 1-1 by inserting the second mobile network IC device 31 of the mobile station 30 into the mobile station 20 shown in FIGS. 2 and 3.

It is supposed that the first mobile network 1-1 requires the subscriber number PM1 in order to trace the first mobile network IC device and that the second mobile network 1-2 requires the terminal identity TM2 in order to trace the second mobile network IC device 31.

The TM database record 32 of the second mobile network IC device 31 inserted into the mobile station 20 is considered as the PM database record of the first mobile network IC device. If a terminal identity TM2 is stored in the TM database record 32, this terminal identity TM2 is treated as a subscriber number PM1 in the mobile network 1-1.

In a PM1 database record for the subscriber number 40 transmitted from the mobile station 20 to the interworking apparatus 2 using the first inter-network signaling protocol for the first mobile network 1-1, the terminal identity TM2 is stored. If the PM1 database record 40 is called as a capsule, the substantial content in the capsule is the terminal identity TM2.

I n the interworking apparatus 2, the transmitted terminal identity TM2 is stored at an address for a No.1 mobile station in the PM database record 5-2a of the second database file 5-2 for No.1 to No.m mobile stations whose home network is the second mobile network 1-2. Since the second mobile network IC device 31 Is visited into the first mobile network 1-1, a network identity indicating this first mobile network 1-1 is also stored at the same address for the No.1 mobile station in the network identity database record 5-2c of the second database file 5-2.

By using the terminal identity TM2 stored in the PM database record 5-2a as the subscriber number PM1, the second mobile network IC device 31 (the mobile station 20 with this IC device 31) can be traced in the first mobile network 1-1.

As shown in FIG. 4, furthermore, a TM2 database record for the subscriber number 41 in which the terminal identity TM2 is stored is transmitted from the interworking apparatus 2 to the second mobile network 1-2 using the second inter-network signaling protocol for the second mobile network 1-2. Thus, the terminal identity TM2 can be transparently transmitted between the second mobile network IC device 31 and the second mobile network 1-2.

Figure 5F:
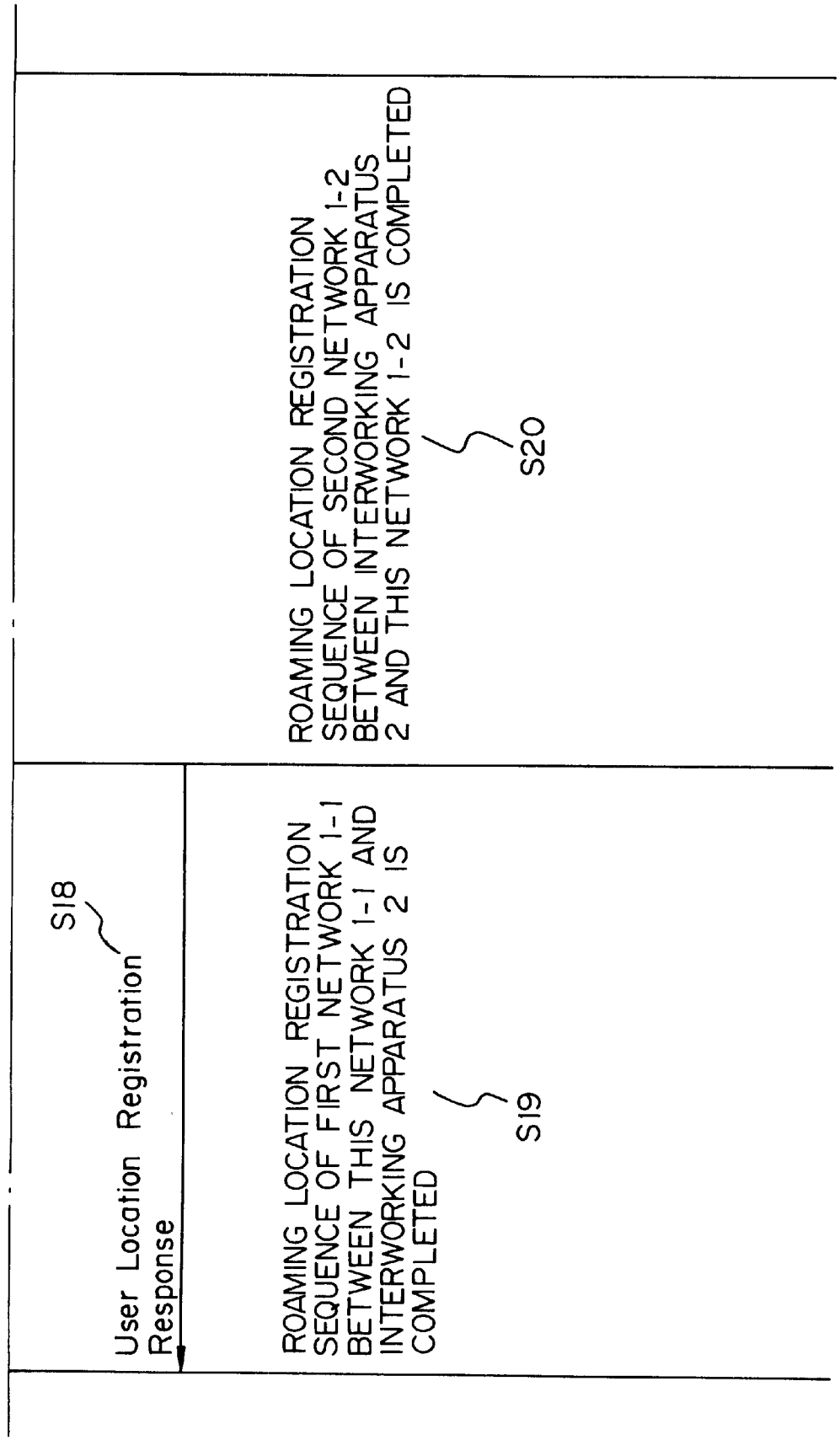

FIG. 5 illustrates a roaming location registration sequence at a roaming from the second mobile network 1-2 to the first mobile network 1-1, for realizing the functions representing in FIG. 4.

First, in the first mobile network 1-1, the second mobile network IC device 31 is inserted into the mobile station 20 whose home network is this first mobile network (step S1).

Then, (a) the inserted second mobile network IC device 31 is considered as a first mobile network IC device; (b) the TM database record 32 of the second mobile network IC device 31 is considered as a PM database record of the first mobile network IC device; (c) the TM database record 32 of the second mobile network IC device 31 is accessed to read out TM2 stored therein; and (d) the read out TM2 is treated as PM1 in the first mobile network 1-1 after that, namely, TM2 is stored in the PM1 database record 40 transmitted in accordance with the first intra/inter-network signaling protocol (step S2).

A conventional roaming location registration sequence of the first mobile network 1-1 using the subscriber number PM1 between the network 1-1 and the interworking apparatus among different mobile networks 2 is started (step S3). First, an "Inter-network Authentication Information Retrieval Request" is transmitted from the first network 1-1 to the interworking apparatus 2 (step S4). With this request, the PM1 database record in which TM2 is stored is transmitted to the interworking apparatus 2.

In the interworking apparatus 2, (a) the transmitted terminal identity TM2 is stored in the PM database record 5-2a of the second database file 5-2 for mobile stations whose home network is the second mobile network 1-2; and (b) it is revealed that the visited network is the first mobile network 1-1 because the "Inter-network Authentication Information Retrieval Request" is received from the first mobile network 1-1, and thus a network identity indicating this first network 1-1 is stored in the network identity database record 5-2c of the second database file 5-2 (step S5).

A conventional roaming location registration sequence of the second mobile network 1-2 using the terminal identity TM2 between the interworking apparatus 2 and the network 1-2 is started (step S6). The interworking apparatus 2 converts the "Inter-network Authentication Information Retrieval Request" already received from the first mobile network 1-1 into "Send Parameter from HLR" (step S7). This "Send Parameter from HLR" is transmitted from the interworking apparatus 2 to the second network 1-2 (step S8). With this transmission, the TM2 database record in which TM2 is stored is transmitted to the network 1-2. The protocol conversion interworking device 4 performs protocol conversions between the first inter-network signaling protocol used in the first mobile network 1-1 and the second inter-network signaling protocol used in the second mobile network 1-2. An "Authentication Parameter" is transmitted from the second network 1-2 to the interworking apparatus 2 (step S9). The interworking apparatus 2 converts the "Authentication Parameter" received from the second mobile network 1-2 into an "Inter-network Authentication Information Retrieval Response" (step S10). This "Inter-network Authentication Information Retrieval Response" is transmitted to the first mobile network 1-1 (step S11).

Then, an "User Location Registration Request" is transmitted from the first network 1-1 to the interworking apparatus 2 (step S12). With this request, the PM1 database record in which TM2 is stored, a RPM1 (Roaming Personal Mobility 1) database record which represents a PM temporally assigned in accordance with a visited PM1 during the conventional roaming location registration sequence of the first mobile network 1-1, and a location area identity of the visited network are transmitted to the interworking apparatus 2.

In the interworking apparatus 2, (a) the location area identity of the visited network, which is defined by the "User Location Registration Request", is stored in the location area identity database record 5-2d of the second database file 5-2; (b) the transmitted RPM1 is stored in the RPM database record 5-2e of the second database file 5-2 (step S13).

The interworking apparatus 2 converts the "User Location Registration Request" received from the first mobile network 11 into an "Update Location" (step S14). This "Update Location" is transmitted from the interworking apparatus 2 to the second network 1-2 (step S15). With this transmission, the TM2 database record in which TM2 is stored is transmitted to the network 1-2. An "Update Location Ack" is transmitted from the second network 1-2 to the interworking apparatus 2 (step S16). The interworking apparatus 2 converts the "Update Location Ack" received from the second mobile network 1-2 into an "User Location Registration Response" (step S17). This "User Location Registration Response" is transmitted to the first mobile network 1-1 (step S18).

Thus, the roaming location registration sequence of the first mobile network 1-1 between this network 1-1 and the interworking apparatus 2, and also the roaming location registration sequence of the second mobile network 1-2 between the interworking apparatus 2 and the network 1-2 are completed (steps S19 and S20). As a result of the roaming location registration, the terminal identity TM2, the network identity indicating the first network 1-1, the location area identity of the visited network and the roaming subscriber number RPM1 are stored in the second database file 5-2 for mobile stations whose home network is the second network 1-2.

Figure 6B:
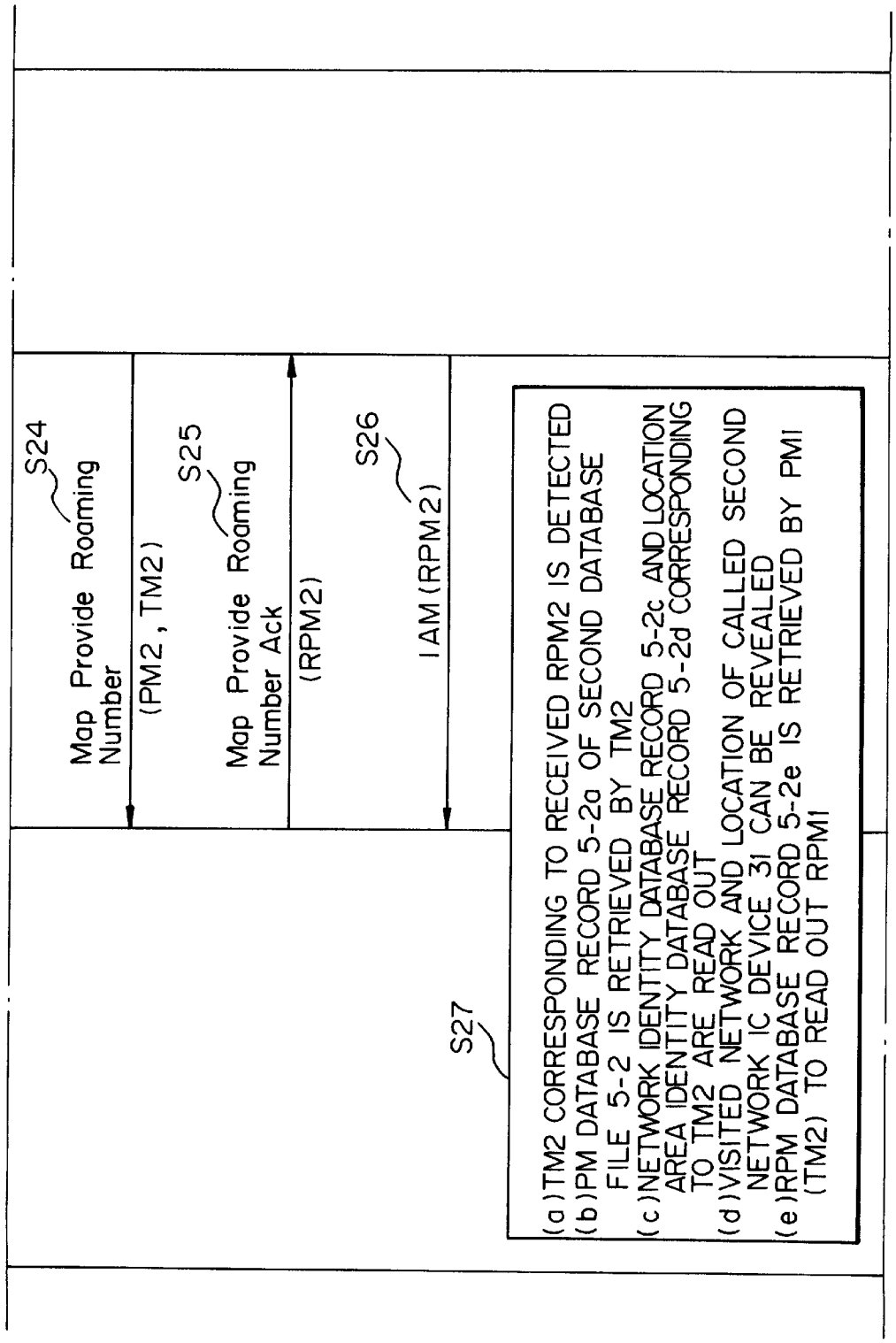
Figure 6C:
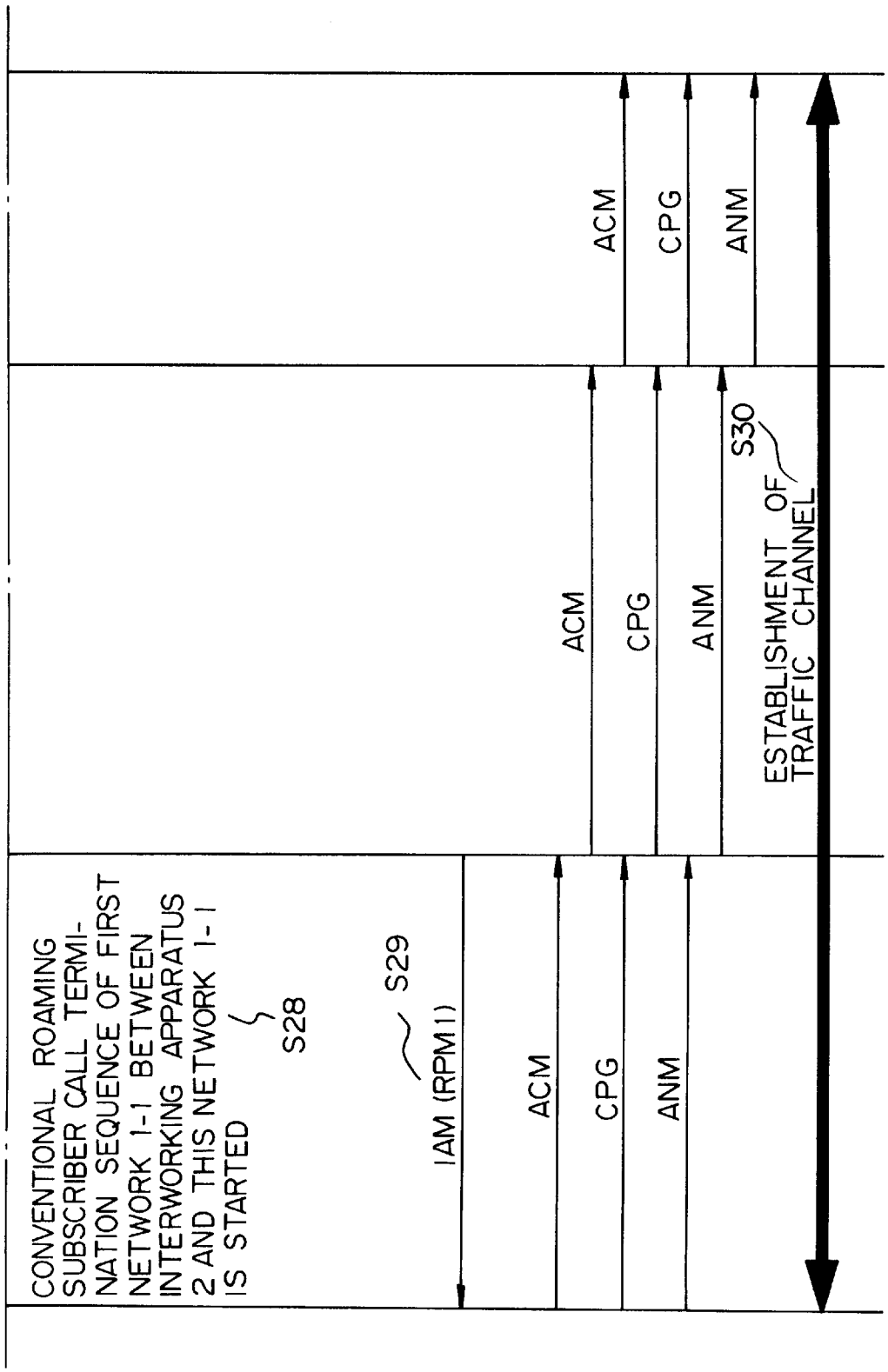

FIG. 6 illustrates a call termination sequence to the second mobile network IC device 31 in the visited first mobile network 1-1, for realizing the functions representing In FIG. 4.

A calling subscriber located in a network such as a fixed network other than the first and second mobile networks 1-1 and 1-2 dials the subscriber number PM2 of the second mobile network IC device 31 (step S21). Thus, a signaling message for establishing traffic channel IAM is transmitted from this network to the second mobile network 1-2 (step S22).

A conventional roaming subscriber call termination sequence of the second mobile network 1-2 between the network 1-2 and the interworking apparatus 2 is started. The protocol conversion interworking device 4 in the interworking apparatus 2 executes this roaming subscriber call termination sequence of a the second mobile network 1-2 (step S23). First, a "Map Provide Roaming Number" is transmitted from the second network 1-2 to the interworking apparatus 2 (step S24). With this request, the PM2 and TM2 are transmitted to the interworking apparatus 2. The interworking apparatus 2 temporally assigns a roaming subscriber number RPM2 (Roaming Personal Mobility 2) to the received PM2 in accordance with the conventional roaming subscriber call termination sequence of the second mobile network 1-2, and then transmits a "Map Provide Roaming Number Ack" with RPM2 to the second network 1-2 (step S25). Then, the signaling message for establishing traffic channel IAM(RPM2) is transmitted from the second mobile network 1-2 to the interworking apparatus 2 (step S26).

In the interworking apparatus 2, (a) a terminal identity TM2 corresponding to the received roaming subscriber number RPM2 is detected; (b) the PM database record 5-2a of the second database file 5-2 is retrieved by the detected TM2; (c) the network identity database record 5-2c and the location area identity database record 5-2d of the second database file 5-2 at the same address as that of the TM2 are read out; (d) thus, the visited network and the location of the called second mobile network IC device 31 can be revealed; and (e) the RPM database record 5-2e of the second database file 5-2 is retrieved by PM1 which is in fact TM2 to read out a corresponding RPM1 (step S27).

A conventional roaming subscriber call termination sequence of the first mobile network 1-1 between the interworking apparatus 2 and the first network 1-1 is started. The protocol conversion interworking device 4 in the interworking apparatus 2 executes this roaming subscriber call termination sequence of the first mobile network 1-1 (step S28). Then, the signaling message for establishing traffic channel IAM(RPM1) is transmitted from the interworking apparatus 2 to the first mobile network 1-1 (step S29).

After the signaling message for establishing traffic channel IAM is transmitted from the network of the calling subscriber to the first mobile network 1-1, the called second mobile network IC device 31 is traced in the first network 1-1. Accordingly, a traffic channel is established and the call termination to the roaming subscriber is completed (step S30).

As aforementioned in detail, according to this embodiment, the terminal identity TM2 is stored in the PM database record for storing subscriber numbers of the mobile stations 5-2a of the second database file 5-2 for mobile stations whose home network is the second mobile network 1-2. Thus, the called second mobile network IC device 31 which is now visiting from its home network 1-2 to the first network 1-1 using different signaling protocol as that of the home network 1-2 can be traced and thus roaming operations among these different networks can be realized.

Figure 7:
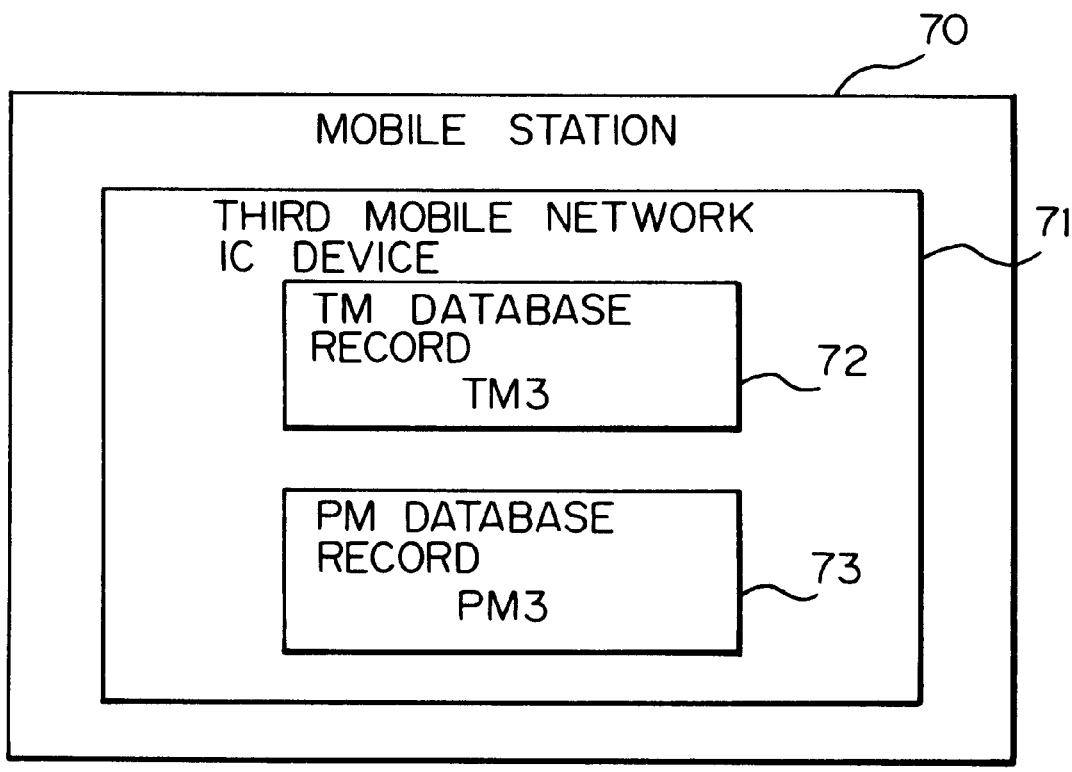
FIG. 7 shows a TM database record and a PM database record, in a mobile station of which home network is a third mobile network, in an another embodiment according to the present invention.

FIG. 7 shows a TM database record and a PM database record in a mobile station of which home network is a third network in an another embodiment according to the present invention. A terminal identity TM3 and a subscriber number PM3 of the third mobile network are stored into the TM database record and the PM database record, respectively.

As shown in FIG. 7, the mobile station 70 has a third mobile network IC device 71. The IC device 71 is provided with a TM database record 72 and a PM database record 73. In the TM database record 72, the terminal identity TM3 of the third mobile network is stored. In the PM database record 73, the subscriber number PM3 of the third mobile network is stored. The IC device 71 may be constituted by an IC card or by an IC chip. This IC device 71 may be freely removed from the mobile station 70 and inserted into an another mobile station or terminal.

FIG. 8 illustrates functions of the interworking apparatus for roaming from the second mobile network 1-2 to the third mobile network 1-3 by inserting the second mobile network IC device 31 of the mobile station 30 into the mobile station 70 shown in FIG. 7.

It is supposed that the third mobile network 1-3 requires the subscriber number PM3 and the terminal identity TM3 in order to trace the third mobile network IC device 70 and that the second mobile network 1-2 requires the terminal identity TM2 in order to trace the second mobile network IC device 31.

The TM database record 32 of the second mobile network IC device 31 inserted into the mobile station 70 is considered as the TM database record 72 of the third mobile network IC device 71. The PM database record 33 of the second mobile network IC device 31 inserted into the mobile station 70 is considered as the PM database record 73 of the third mobile network IC device 71. If a terminal identity TM2 is stored in the TM database record 32, this terminal identity TM2 is treated as a terminal identity TM3 in the mobile network 1-3. Also, If a subscriber number PM2 is stored in the PM database record 33, this subscriber number PM2 is treated as a subscriber number PM3 in the mobile network 1-3.

In a TM3 database record for the terminal identity 80 transmitted from the mobile station 70 to the interworking apparatus 2 using a third inter-network signaling protocol for the third mobile network 1-3, the terminal identity TM2 is stored. If the TM3 database record 80 is called as a capsule, the substantial content in the capsule is the terminal identity TM2.

In a PM3 database record for the subscriber number 81 transmitted from the mobile station 70 to the interworking apparatus 2 using the third inter-network signaling protocol for the third mobile network 1-3, the subscriber number PM2 is stored. If the PM3 database record 81 is called as a capsule, the substantial content in the capsule is the terminal identity PM2.

In the interworking apparatus 2, the transmitted subscriber number PM2 is stored at an address for a No.1 mobile station in the PM database record 5-2a and the transmitted terminal identity TM2 is stored at the same address in the TM database record 5-2b of the second database file 5-2 for No. 1 to No.m mobile stations whose home network is the second mobile network 1-2. Since the second mobile network IC device 31 is visited into the third mobile network 1-3, a network identity indicating this third mobile network 1-3 is also stored at the same address in the network identity database record 5-2c of the second database file 5-2.

By using the subscriber number stored in the PM database record 5-2a as the subscriber number PM3 and terminal identity TM2 stored in the TM database record 5-2b as the terminal identity TM3, the second mobile network IC device 31 (the mobile station 70 with this IC device 31) can be traced in the third mobile network 1-3.

As shown in FIG. 8, furthermore, a TM2 database record for the subscriber number 82 in which the terminal identity TM2 is stored is transmitted from the interworking apparatus 2 to the second mobile network 1-2 using the second inter-network signaling protocol for the second mobile network 1-2. Thus, the terminal identity TM2 can be transparently transmitted between the second mobile network IC device 31 and the second mobile network 1-2.

Figure 9C:
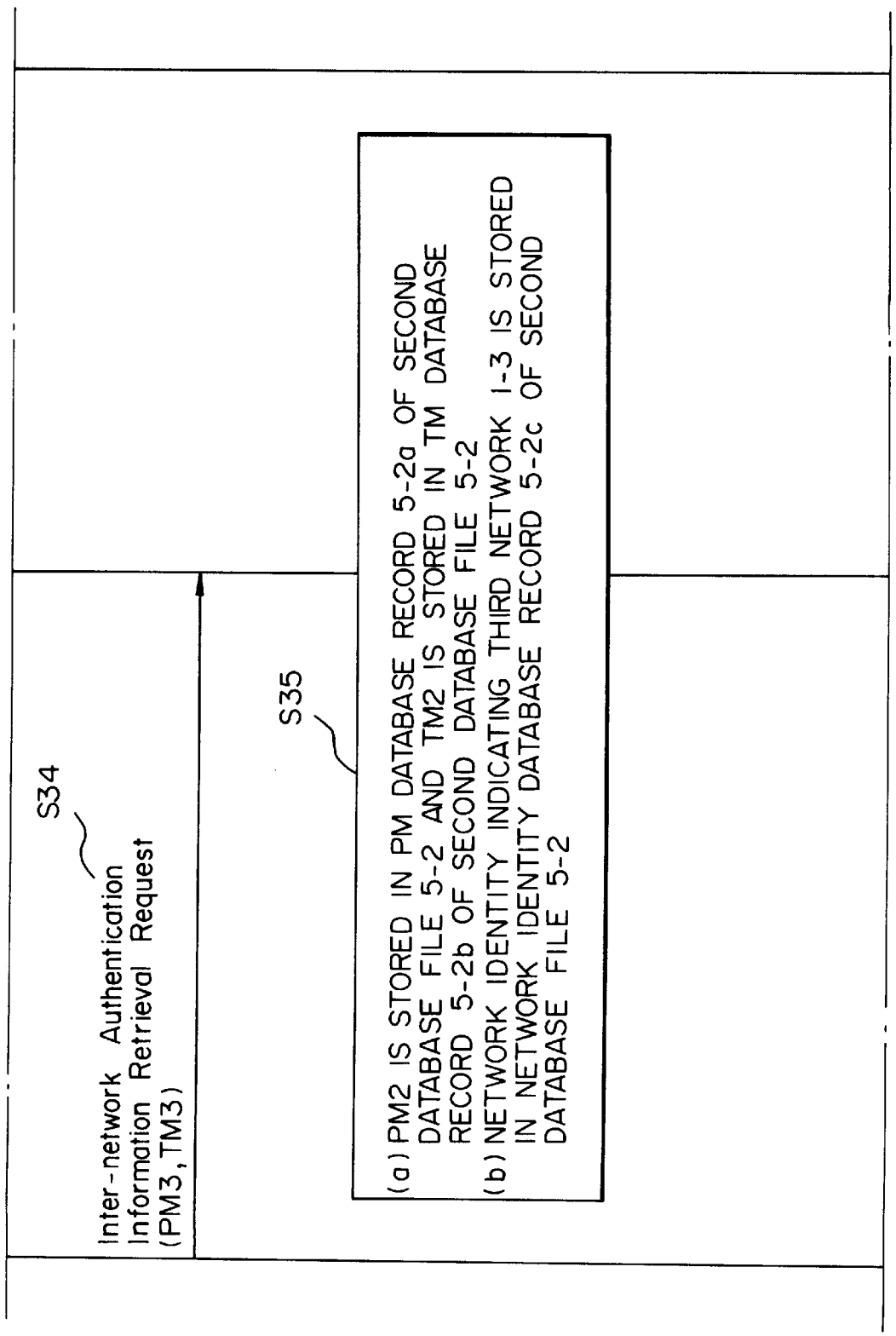
Figure 9D:
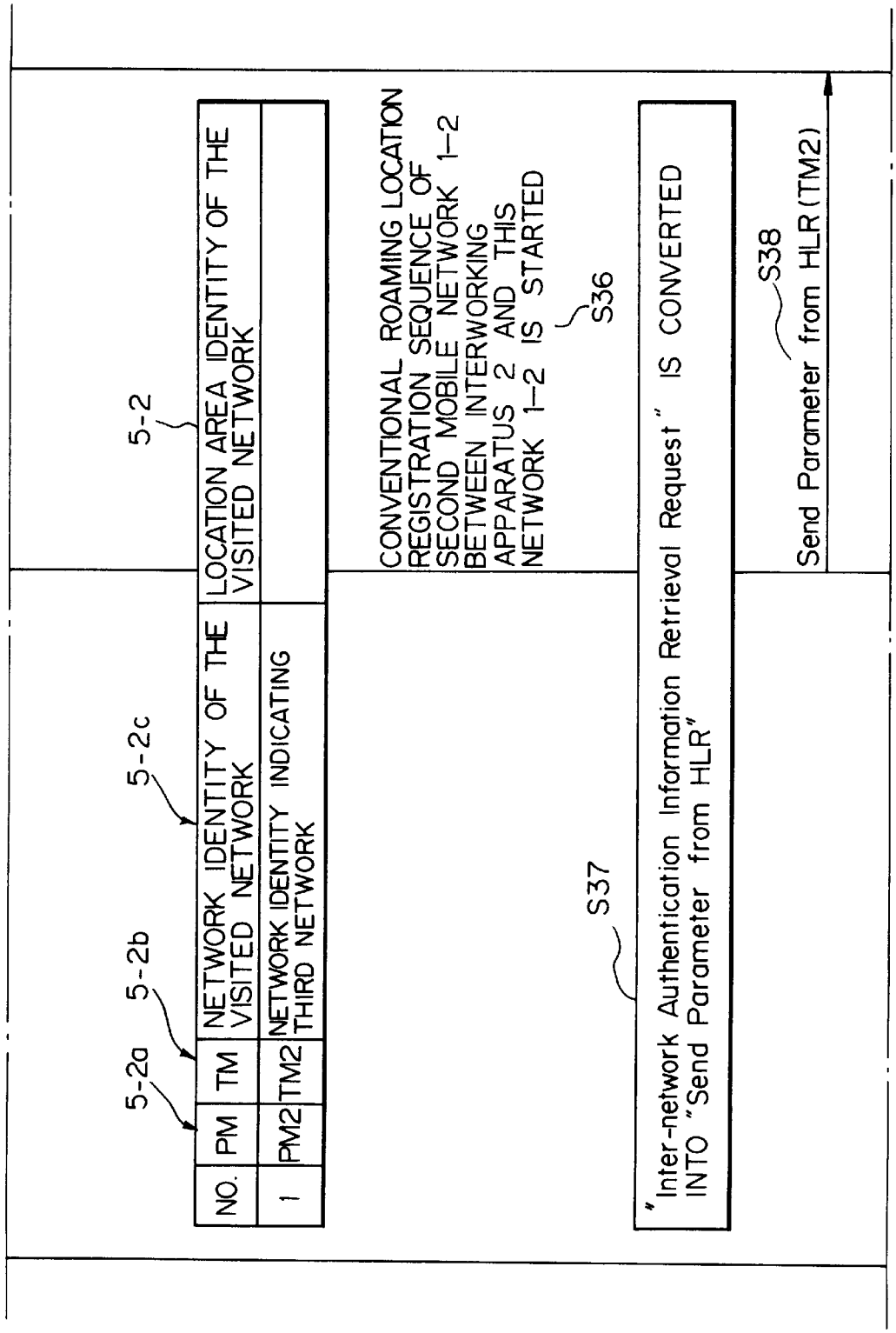

FIG. 9 illustrates a roaming location registration sequence at a roaming from the second mobile network 1-2 to the third mobile network 1-3, for realizing the functions representing in FIG. 8.

First, in the third mobile network 1-3, the second mobile network IC device 31 is inserted into the mobile station 70 whose home network is this third mobile network (step S31).

Then, (a) the inserted second mobile network IC device 31 is considered as a third mobile network IC device; (b) the TM database record 32 of the second mobile network IC device 31 is considered as a TM database record of the third mobile network IC device and the PM database record 33 of the second mobile network IC device 31 is considered as a PM database record of the third mobile network IC device; (c) the TM database record 32 and the PM database record 33 of the second mobile network IC device 31 are accessed to read out TM2 and PM2 respectively stored therein; and (d) the read out TM2 and PM2 are treated as TM3 and PM3 in the third mobile network 1-3 respectively after that, and TM2 and PM2 are stored in the TM2 database record 80 and PM2 database record 81, respectively, transmitted in accordance with the third intra/inter-network signaling protocol (step S32).

A conventional roaming location registration sequence of the third mobile network 1-3 between the network 1-3 and the interworking apparatus among different mobile networks 2 is started (step S33). First, an "Inter-network Authentication Information Retrieval Request" is transmitted from the third network 1-3 to the interworking apparatus 2 (step S34). With this request, the TM3 database record in which TM2 is stored and the PM3 database record in which PM2 is stored are transmitted to the interworking apparatus 2.

In the interworking apparatus 2, (a) the transmitted subscriber number PM2 is stored in the PM database record 5-2a of the second database file 5-2 for mobile stations whose home network is the second mobile network 1-2 and the transmitted terminal identity TM2 is stored in the TM database record 5-2b of the second database file 5-2; and (b) it is revealed that the visited network is the third mobile network 1-3 because the "Inter-network Authentication Information Retrieval Request" is received from the third mobile network 1-3, and thus a network identity indicating this third network 1-3 is stored in the network identity database record 5-2c of the second database file 5-2 (step S35).

A conventional roaming location registration sequence of the second mobile network 1-2 between the interworking apparatus 2 and the network 1-2 is started (step S36). The interworking apparatus 2 converts the "Inter-network Authentication Information Retrieval Request" already received from the third mobile network 1-3 into "Send Parameter from HLR" (step S37). This "Send Parameter from HLR" is transmitted from the interworking apparatus 2 to the second network 1-2 (step S38). With this transmission, the TM2 database record in which TM2 is stored is transmitted to the network 1-2. The protocol conversion interworking device 4 performs protocol conversions between the third inter-network signaling protocol used in the third mobile network 1-3 and the second inter-network signaling protocol used in the second mobile network 1-2. An "Authentication Parameter" is transmitted from the second network 1-2 to the interworking apparatus 2 (step S39). The interworking apparatus 2 converts the "Authentication Parameter" received from the second mobile network 1-2 into an "Inter-network Authentication Information Retrieval Response" (step S40). This "Inter-network Authentication Information Retrieval Response" is transmitted to the third mobile network 1-3 (step S41).

Then, an "User Location Registration Request" is transmitted from the third network 1-3 to the interworking apparatus 2 (step S42). With this request, the PM3 database record in which PM2 is stored, the TM3 database record in which TM2 is stored, a RPM3 (Roaming Personal Mobility 3) database record which represents a PM temporally assigned in accordance with a visited PM3 during the conventional roaming location registration sequence of the third mobile network 1-3, and a location area identity of the visited network are transmitted to the interworking apparatus 2.

In the interworking apparatus 2, (a) the location area identity of the visited network, which is defined by the "User Location Registration Request", is stored in the location area identity database record 5-2d of the second database file 5-2; (b) the transmitted RPM3 is stored in the RPM database record 5-2e of the second database file 5-2 (step S43).

The interworking apparatus 2 converts the "User Location Registration Request" received from the third mobile network 1-3 into an "Update Location" (step S44). This "Update Location" is transmitted from the interworking apparatus 2 to the second network 1-2 (step S45). With this transmission, the TM2 database record in which TM2 is stored is transmitted to the network 1-2. An "Update Location Ack" is transmitted from the second network 1-2 to the interworking apparatus 2 (step S46). The interworking apparatus 2 converts the "Update Location Ack" received from the second mobile network 1-2 into an "User Location Registration Response" (step S47). This "User Location Registration Response" is transmitted to the third mobile network 1-3 (step S48).

Thus, the roaming location registration sequence of the third mobile network 1-3 between this network 1-3 and the interworking apparatus 2, and also the roaming location registration sequence of the second mobile network 1-2 between the interworking apparatus 2 and the network 1-2 are completed (steps S49 and S50). As a result of the roaming location registration, the subscriber number PM2, the terminal identity TM2, the network identity indicating the third network 1-3, the location area identity of the visited network and the roaming subscriber number RPM3 are stored in the second database file 5-2 for mobile stations whose home network is the second network 1-2.

FIG. 10 illustrates a call termination sequence to the second mobile network IC device 31 in the visited third mobile network 1-3, for realizing the functions representing in FIG. 8.

A calling subscriber located in a network such as a fixed network other than the second and third mobile networks 1-2 and 1-3 dials the subscriber number PM2 of the second mobile network IC device 31 (step S51). Thus, a signaling message for establishing traffic channel IAM is transmitted from this network to the second mobile network 1-2 (step S52).

A conventional roaming subscriber call termination sequence of the second mobile network 1-2 between the network 1-2 and the interworking apparatus 2 is started. The protocol conversion interworking device 4 in the interworking apparatus 2 executes this roaming subscriber call termination sequence of the second mobile network 1-2 (step S53). First, a "Map Provide Roaming Number" is transmitted from the second network 1-2 to the interworking apparatus 2 (step S54). With this request, the PM2 and TM2 are transmitted to the interworking apparatus 2. The interworking apparatus 2 temporally assigns a roaming subscriber number RPM2 (Roaming Personal Mobility 2) to the received PM2 in accordance with the conventional roaming subscriber call termination sequence of the second mobile network 1-2, and then transmits a "Map Provide Roaming Number Ack" with RPM2 to the second network 1-2 (step S55). Then, the signaling message for establishing traffic channel IAM(RPM2) is transmitted from the second mobile network 1-2 to the interworking apparatus 2 (step S56).

In the interworking apparatus 2, (a) a terminal identity TM2 corresponding to the received roaming subscriber number RPM2 is detected; (b) the PM database record 5-2a of the second database file 5-2 is retrieved by the detected TM2; (c) the network identity database record 5-2c and the location area identity database record 5-2d of the second database file 5-2 at the same address as that of the TM2 are read out; (d) thus, the visited network and the location of the called second mobile network IC device 31 can be revealed; and (e) the RPM database record 5-2e of the second database file 5-2 is retrieved by PM3 which is in fact PM2 to read out a corresponding RPM3 (step S57).

A conventional roaming subscriber call termination sequence of the third mobile network 1-3 between the interworking apparatus 2 and the third network 1-3 is started. The protocol conversion interworking device 4 in the interworking apparatus 2 executes this roaming sub-scriber call termination sequence of the third mobile network 1-3 (step S58). Then, the signaling message for establishing traffic channel IAM(RPM3) is transmitted from the interworking apparatus 2 to the third mobile network 1-3 (step S59).

After the signaling message for establishing traffic channel IAM is transmitted from the network of the calling subscriber to the third mobile network 1-3, the called second mobile network IC device 31 is traced in the third network 1-3. Accordingly, a traffic channel is established and the call termination to the roaming subscriber is completed (step S60).

As aforementioned in detail, according to this embodiment, the terminal identity TM2 is stored in the TM database record for storing terminal identities 5-2b and the subscriber number PM2 is stored in the PM database record for storing subscriber numbers 5-2a, of the second database file 5-2 for mobile stations whose home network is the second mobile network 1-2. Thus, the called second mobile network IC device 31 which is now visiting from its home network 1-2 to the third network 1-3 using different signaling protocol as that of the home network 1-2 can be traced and thus roaming operations among these different networks can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An interworking apparatus for roaming among a plurality of different types of mobile networks using protocols which identify subscribers and terminals in different ways, said apparatus being connected among said plurality of different types of mobile networks comprising:

means for converting between protocols of said plurality of different types of mobile networks; and means for holding network identity information for identifying a mobile network to which at least one mobile user to be traced is visited.

2. The apparatus as claimed in claim 1, wherein said apparatus further comprises means for holding location area identity information for identifying a location area of the mobile user in the visited mobile network.

3. An interworking apparatus for roaming among a plurality of different types of mobile networks using protocols which identify subscribers and terminals in different ways, said plurality of different types of mobile networks including a first mobile network using a first signaling protocol which uses a subscriber number PM1 for identifying a subscriber and a terminal identity TM1 for identifying a terminal, and a second mobile network using a second protocol which is different from said first protocol and uses a terminal identity TM2 for identifying a terminal, said apparatus being connected between said first and second mobile networks comprising:

means for converting between protocols of said plurality of different types of mobile networks;

subscriber number storage means for holding the subscriber number PM1; and means for storing the terminal identity TM2 of a mobile user visiting from said second mobile network to said first mobile network into said subscriber number storage means, said visiting mobile user being traced in said first mobile network by using said terminal identity TM2 stored in said subscriber number storage means.

4. The apparatus as claimed in claim 3, wherein said apparatus further comprises means for holding network identity information for identifying the visited mobile network.

5. The apparatus as claimed in claim 3, wherein said apparatus further comprises means for holding location area identity information for identifying a location area of the mobile user in the visited mobile network.

6. An interworking apparatus for roaming among a plurality of different types of mobile networks using protocols which identify subscribers and terminals in different ways, said plurality of different types of mobile networks including a second mobile network having a second protocol which uses a subscriber number PM2 for identifying a subscriber and a terminal identity TM2 for identifying a terminal, and a third mobile network using a third protocol which is different from said second protocol and uses a subscriber number PM3 for identifying a subscriber and a terminal identity TM3 for identifying a terminal, said apparatus being connected between said second and third mobile networks comprising:

means for converting between protocols of said plurality of different types of mobile networks:

subscriber number storage means for holding the subscriber number PM3;

terminal identity storage means for holding the terminal identity TM3;

means for storing the subscriber number PM2 of a mobile user visiting from said second mobile network to said third mobile network into said subscriber number storage means; and means for storing the terminal identity TM2 of said visiting mobile user into said terminal identity storage means, said visiting mobile user being traced in said third mobile network by using said subscriber number PM2 stored in said subscriber number storage means and said terminal identity TM2 stored in said terminal identity storage means.

7. The apparatus as claimed in claim 6, wherein said apparatus further comprises means for holding network identity information for identifying the visited mobile network.

8. The apparatus as claimed in claim 6, wherein said apparatus further comprises means for holding location area identity information for identifying a location area of the mobile user in the visited mobile network.

* * * * *